US006668951B2

(12) United States Patent
Won

(10) Patent No.: US 6,668,951 B2
(45) Date of Patent: Dec. 30, 2003

(54) ROBOTIC PLATFORM

(75) Inventor: Chikyung Won, Somerville, MA (US)

(73) Assignee: iRobot Corporation, Burlington, MA (US)

( * ) Notice: Subject to any disclaimer, the term of this patent is extended or adjusted under 35 U.S.C. 154(b) by 0 days.

(21) Appl. No.: 10/202,376

(22) Filed: Jul. 24, 2002

(65) Prior Publication Data

US 2002/0189871 A1 Dec. 19, 2002

Related U.S. Application Data

(63) Continuation of application No. 09/888,760, filed on Jun. 25, 2001, now Pat. No. 6,431,296, which is a continuation of application No. 09/237,570, filed on Jan. 26, 1999, now Pat. No. 6,263,989.
(60) Provisional application No. 60/096,141, filed on Aug. 11, 1998, and provisional application No. 60/079,701, filed on Mar. 27, 1998.

(51) Int. Cl.⁷ .............................................. B62D 55/00
(52) U.S. Cl. ...................... 180/9.1; 305/127; 305/199
(58) Field of Search ........................ 180/193, 9.1, 9.62; 446/433; 305/120, 126, 127, 165, 195, 199

(56) References Cited

U.S. PATENT DOCUMENTS

| 3,166,138 | A |   | 1/1965  | Dunn, Jr. |
|-----------|---|---|---------|-----------|
| 3,311,424 | A | * | 3/1967  | Taylor ........................ 305/110 |
| 3,489,236 | A |   | 1/1970  | Goodwin |
| 3,609,804 | A |   | 10/1971 | Morrison |
| 3,756,667 | A | * | 9/1973  | Bombardier ................ 305/127 |
| 3,774,979 | A | * | 11/1973 | Harris ........................ 305/168 |
| 4,082,372 | A | * | 4/1978  | Kozuki ........................ 305/199 |
| 4,565,412 | A | * | 1/1986  | Comminge ................ 305/199 |
| 4,566,551 | A |   | 1/1986  | Feliz |
| 4,702,331 | A |   | 10/1987 | Hagihara et al. |
| 4,709,773 | A |   | 12/1987 | Clement et al. |
| 4,932,491 | A |   | 6/1990  | Collins, Jr. |
| 4,977,971 | A |   | 12/1990 | Crane, III et al. |
| 5,022,812 | A |   | 6/1991  | Coughlan et al. |
| 5,135,427 | A | * | 8/1992  | Suto ........................... 446/433 |
| 5,174,405 | A |   | 12/1992 | Carra et al. |
| 5,337,846 | A |   | 8/1994  | Ogaki et al. |
| 5,340,206 | A | * | 8/1994  | Young ......................... 305/136 |
| 5,363,935 | A |   | 11/1994 | Schempf et al. |
| 5,435,405 | A |   | 7/1995  | Schempf et al. |
| 5,443,354 | A |   | 8/1995  | Stone et al. |
| 5,451,135 | A |   | 9/1995  | Schempf et al. |
| 5,465,525 | A |   | 11/1995 | Mifune et al. |
| 5,921,843 | A | * | 7/1999  | Skrivan ....................... 446/433 |
| 6,068,353 | A | * | 5/2000  | Juncker ....................... 305/130 |

\* cited by examiner

Primary Examiner—Daniel G. DePumpo
(74) Attorney, Agent, or Firm—Fish & Richardson P.C.; Glen D. Weinstein

(57) ABSTRACT

An articulated tracked vehicle that has a main section, which includes a main frame, and a forward section. The main frame has two sides and a front end, and includes a pair of parallel main tracks. Each main track includes a flexible continuous belt coupled to a corresponding side of the main frame. The forward section includes an elongated arm. One end of the arm is pivotally coupled to the main frame near the forward end of the main frame about a transverse axis that is generally perpendicular to the sides of the main frame. The arm has a length sufficiently long to allow the forward section to extend below the main section in at least some degrees of rotation of the arm, and a length shorter than the length of the main section. The center of mass of the main section is located forward of the rearmost point reached by the end of the arm in its pivoting about the transverse axis. The main section is contained within the volume defined by the main tracks and is symmetrical about a horizontal plane, thereby allowing inverted operation of the robot.

21 Claims, 20 Drawing Sheets

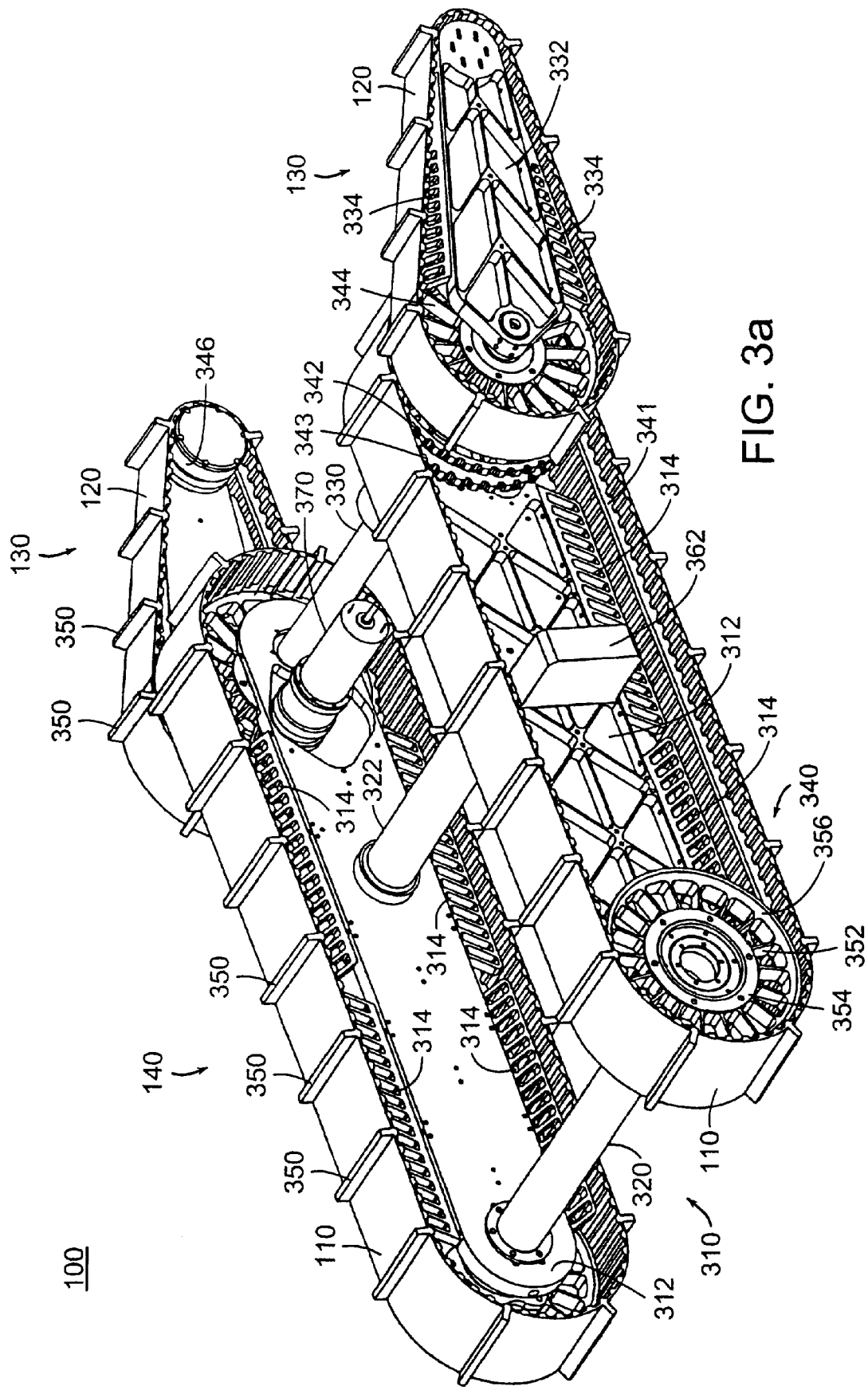

ROBOTIC PLATFORM

CROSS REFERENCE TO RELATED APPLICATIONS

This application is a continuation of U.S. application Serial No. 09/888,760, filed Jun. 25, 2001 now U.S. Pat. No. 6,431,296, which is a continuation of U.S. application Ser. No. 09/237,570, filed Jan. 26, 1999, and issued Jul. 24, 2001, as U.S. Pat. No. 6,263,989, which claims the benefit of Provisional Application Serial No. 60/096,141, filed Aug. 11, 1998, and U.S. Provisional Application Serial No. 60/079,701, filed Mar. 27, 1998.

STATEMENT AS TO FEDERALLY SPONSORED RESEARCH

This invention was made in part with Government support under contract DAAL01-97-C-0157 awarded by the Army Research Laboratory of the Department of the Army. The Government may have certain rights in the invention.

BACKGROUND OF THE INVENTION

The invention relates to a robotically controlled mobility platform.

Robots are useful in a variety of civilian, military, and law enforcement applications. For instance, a robotically controlled mobility platform inspect or search buildings with structural damage caused by earthquakes, floods, or hurricanes, or inspect buildings or outdoor sites contaminated with radiation, biological agents such as viruses or bacteria, or chemical spills. The platform can carry appropriate sensor systems for its inspection or search tasks. Military applications include operations that are deemed too dangerous for soldiers. For instance, the robot can be used to leverage the effectiveness of a human "pointman." Law enforcement applications include reconnaissance, surveillance, bomb disposal and security patrols.

The mobility approaches that have been used in prior robotic platforms exhibit various shortcomings, many of which are addressed by the present invention.

SUMMARY OF THE INVENTION

In one aspect, in general, the invention is an articulated tracked vehicle. The vehicle has a main section which includes a main frame and a forward section. The main frame has two sides and a front end, and includes a pair of parallel main tracks. Each main track includes a flexible continuous belt coupled to a corresponding side of the main frame. The forward section includes an elongated arm having a proximal end and a distal end. The proximal end of the arm is pivotally coupled to the main frame near the forward end of the main frame about a transverse axis that is generally perpendicular to the sides of the main frame.

Alternative embodiments include one or more of the following features:

The arm is sufficiently long to allow the forward section to extend below the main section in at least some degrees of rotation of the arm, and the arm is shorter than the length of the main section.

The center of mass of the main section is located forward of the rearmost point reached by the distal end of the arm in its pivoting about the transverse axis.

The main section is contained within the volume defined by the main tracks and is symmetrical about a horizontal plane, thereby allowing inverted operation of the robot.

The vehicle is dimensioned for climbing a set of stairs. At a first adjusted angle between the main section and the forward section, the forward section rises more than the rise of the bottom-most of the set of stairs. At a second adjusted angle between the main section and the forward section, the length spanned by the combination of the main section and the forward section being greater than the diagonal span of two successive stairs. The center of gravity of the vehicle is located in a position so that the vehicle remains statically stable as it climbs the stairs at the second adjusted angle.

The forward section includes a second arm, also pivotally coupled to the main frame near its forward end. For instance, the arms are coupled to the main frame such that they rotate outside the main tracks. The two arms can be rigidly coupled and rotated together by the articulator motor. The articulator motor provides sufficient torque between the main frame and the arms to raise the rear end of the main section thereby supporting the vehicle on the front section. Continuous rotation of the arms can provide forward locomotion of the vehicle. A harmonic drive can be coupled between the articulator motor and the two arm. The harmonic drive provides a torque to the two arms greater than the torque provided to it by the articulator motor. A clutch can be coupled between the articulator motor and the two arms. The clutch allows rotation of the arms without rotation of the motor if the torque between the arms and the main section exceeds a limit. A pair of flexible forward tracks can be coupled to the two arms.

A pair of drive pulleys for supporting and driving each of the main and forward tracks are included, one on each side of the vehicle. The drive pulleys are coaxial with the transverse axis of rotation of the arms, and are joined so that they rotate together. The vehicle can include a pair of drive motors, one coupled to both the main and forward drive pulleys on a corresponding side of the vehicle.

On each side of the main frame, two compliant pulleys are coupled between one of the main tracks and the main frame, and multiple compliant track supports are coupled between the tracks and the side plates. Each pulley includes a compliant outer rim, a hub, and multiple compliant spoke segments coupled between the rim and the hub.

Multiple compliant longitudinal track supports coupled between the main frame and the continuous belts. Each longitudinal track support has a series of open slots forming a series of rib sections between the upper and lower edges of the support.

The pulleys and main frame are recessed within the volumes defined by the tracks.

Each track includes a flexible continuous belt and a series of compliant cleats attached transversely on the outside of the belt.

The main tracks each include a longitudinal rib coupled to the inside surface of the belt, and each of the pulleys includes a channel around its circumference which accepts the longitudinal rib. The channels are dimensioned larger than the rib thereby allowing debris to be caught between a pulley and a tracks without dislodging the track from the pulley.

In another aspect, in general, the invention is a method for operating an articulated tracked vehicle having a main tracked chassis and a pivoting forward arm for the vehicle to climb a set of stairs. The method includes pivoting the arm to raise the arm higher than the rise of the bottom-most stair of the set of stairs, then approaching the first stair until the arm contacts the first stair. The method further includes driving the main tracks until the main tracks contacts the first stair, and then pivoting the arm to extend the tracked base of the vehicle. The method then includes driving the main tracks to ascend the set of stairs.

In another aspect, in general, the invention is a method for inverting an articulated tracked vehicle which has a main tracked chassis and a pivoting arm. The method includes supporting the vehicle on the main tracks in a first vertical orientation, supporting the vehicle on the pivoting arm, and then pivoting the arm to raise the main chassis above the supporting surface. Further pivoting of the arm passes the main chassis past a stable point. This results in the vehicle being supported on the main tracks in a second vertical orientation, the second vertical orientation being inverted with respect to the first orientation.

Aspects of the invention include one or more of the following advantages. One advantage is immediate recovery from tumbles in which the vehicle lands on its "back." The vehicle can operate with either side up and therefore does not necessarily require righting. Also, if one vertical orientation is preferable over another, for example, due to placement of sensors, the robot can invert itself to attain a preferred orientation.

Another advantage is impact resistance. Impact resistance allows the robot to operate even after collisions, falls, or tumbles. Furthermore, impact resistance allows deploying the robot in a variety of ways including tossing it from a height, such as from a window or from a helicopter.

The housing of components within the track volume has the advantage that the robot's components are less likely to be damaged in a fall or tumble. Recessing the side plates of the robot frame within the track volume also reduces the likelihood of impacting the frame in such a tumble or fall.

The robot's forward center of gravity has the advantage that it aids stair climbing and climbing of steep inclines. Also, a center of gravity within the extent of the forward articulated section allows the robot to perform a self righting operation and to operate in an upright posture by supporting the platform solely on the forward section.

The robot's articulated body, including continuously rotatable arms, has the advantage that the robot can be driven using a "paddling" action of the arms. This mode of driving the vehicle is useful, for instance, when the tracks have inadequate traction, for example due to an obstruction supporting the center of the frame.

Compliant idler and drive pulleys provide robustness to debris that may be caught between the tracks and the pulleys. Also, raised segments on the tracks mating with corresponding channels in the outside rims of the idler and drive pulleys reduces the possibility of "throwing" a track. Loose mating of the raised segments and the channels also permits debris being caught between the pulleys and the track without throwing a track or stalling a drive motor.

Other features and advantages of the invention will be apparent from the following detailed description, and from the claims.

BRIEF DESCRIPTION OF THE DRAWINGS

FIGS. 3a–c are a perspective, side, and top view, respectively, of a robot;

DETAILED DESCRIPTION

Figure 1:
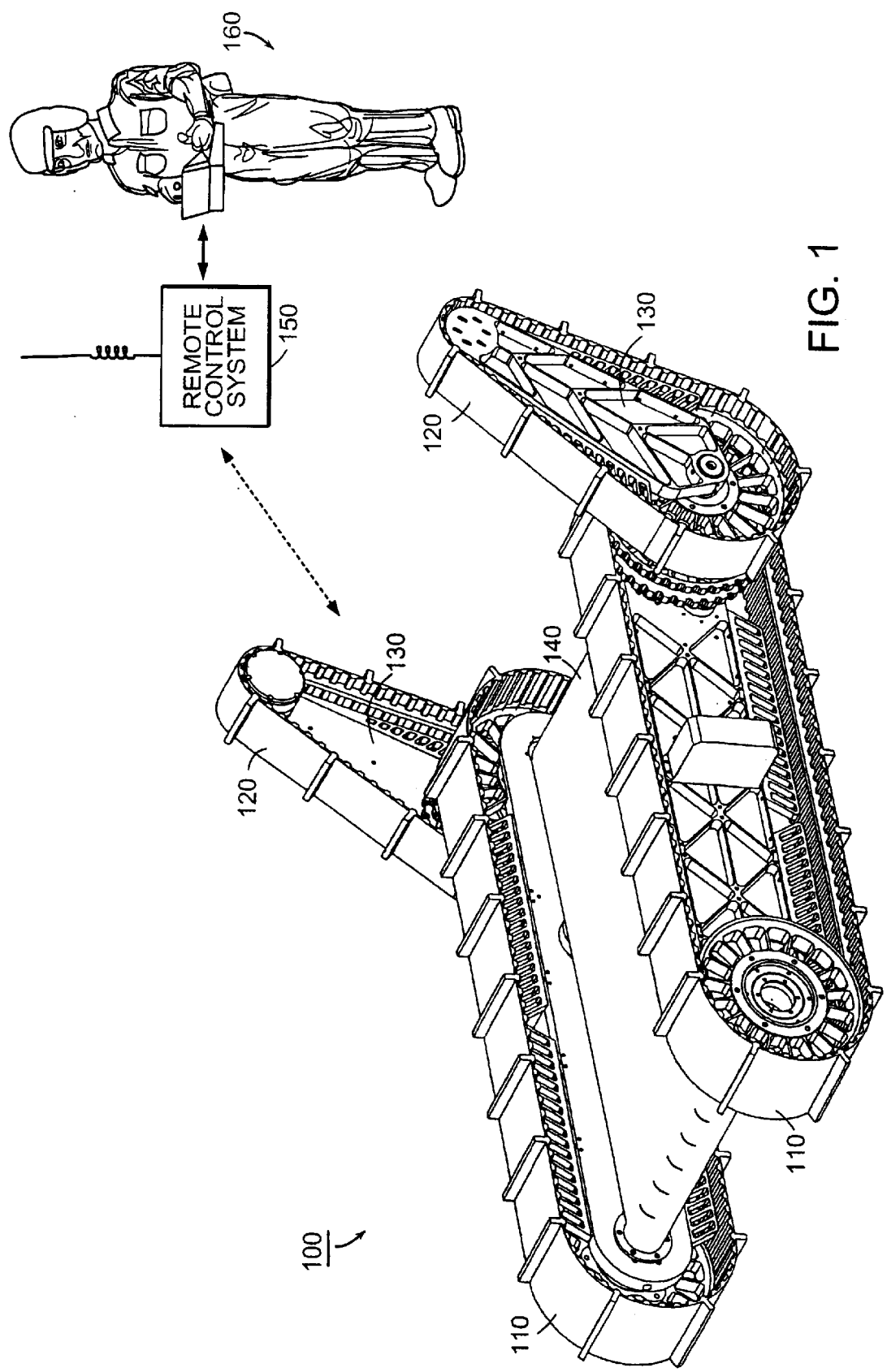
FIG. 1 illustrates teleoperator control of a robot.

Referring to FIG. 1, a version of the system includes a robot 100, and a remote control system 150. Remote control system 150 allows an operator 160 to control robot 100 from a distance. The operator can select different levels of human control over the robot, ranging from a teleoperation mode, in which the operator directly controls the motors and actuators on the robot, to autonomous operation, in which the operator passes higher-level command to the robot. In partially autonomous operation, robot 100 can perform tasks such as following a wall, recovering from being stuck in an opening or due to high centering on an obstruction, evading a moving object, or seeking light.

Robot 100 moves around its environment on a pair of parallel main tracks 110 and a pair of tapered forward tracks 120. Main tracks 110 are mounted on a main body 140 of the robot. Robot 100 is articulated. In particular, forward tracks 120 are mounted on a pair of forward arms 130, which are pivotally attached to the main body 140 and can be positioned at any angle to main body 140. Robot 100 is designed to move about in a variety of environments, including an urban environment of buildings (including staircases), streets, underground tunnels, and building ruble, as well as in vegetation, such as through grass and around trees. Robot 100 has a variety of features which provide robust operation in these environments, including impact resistance, tolerance of debris entrainment, and invertible operability. The robot's design is symmetrical about a horizontal plane so that it looks the same upside down and can operate identically in either orientation. Therefore, the robot can recover quickly from a tumble or fall in which it is inverted.

Figure 2:
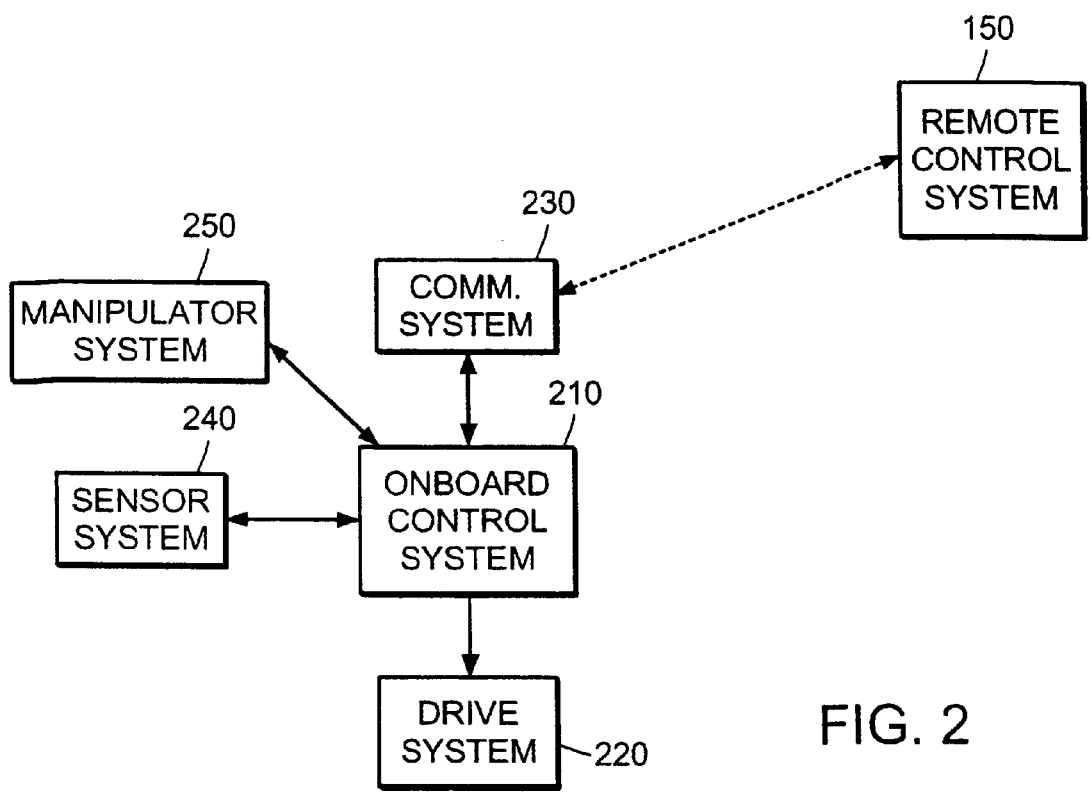
FIG. 2 is a functional block diagram of system components of a robot.

Referring to FIG. 2, robot 100 includes an onboard control system 210, which includes one or more computer processors and associated memory systems. Onboard control system 210 is coupled to a drive system 220, which includes motors that drive main and forward tracks 110 and 120 and drive arms 130. Onboard control system 210 is coupled to a communication system 230, which includes, for example, a radio for exchanging control and feedback information with remote control system 150. Robot 100 can optionally carry a sensor system 240, including, for example, a camera, to provide feedback to operator 160. Sensor system 240 also provides input to onboard control system 210, such as the angle between arms 130 and the main body. These inputs are used during fully or partially autonomous operation. Robot 100 can also optionally carry a manipulator system 250, including, for example, a door opening device, for use under remote or autonomous control.

Figure 3B:
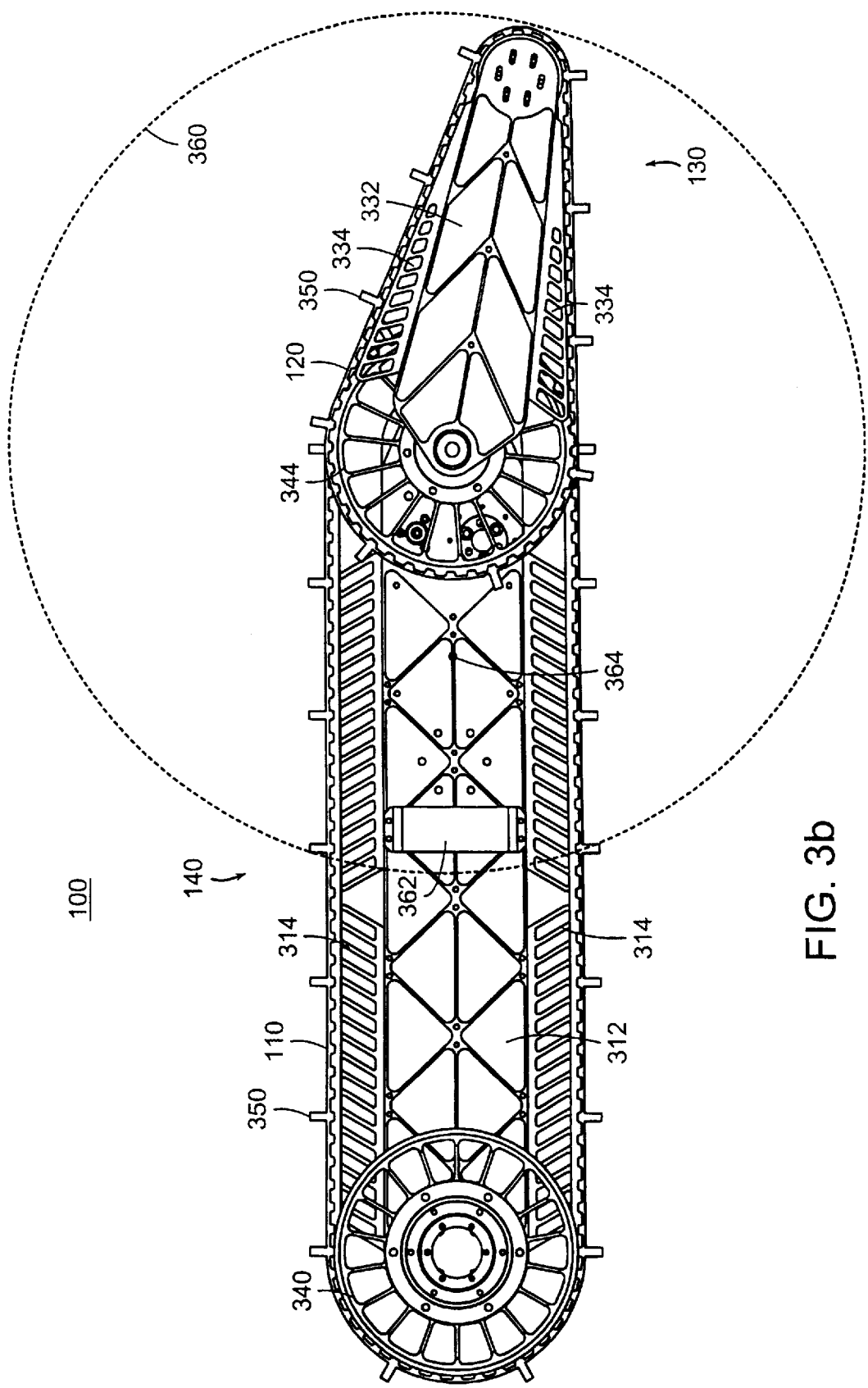
Figure 3C:
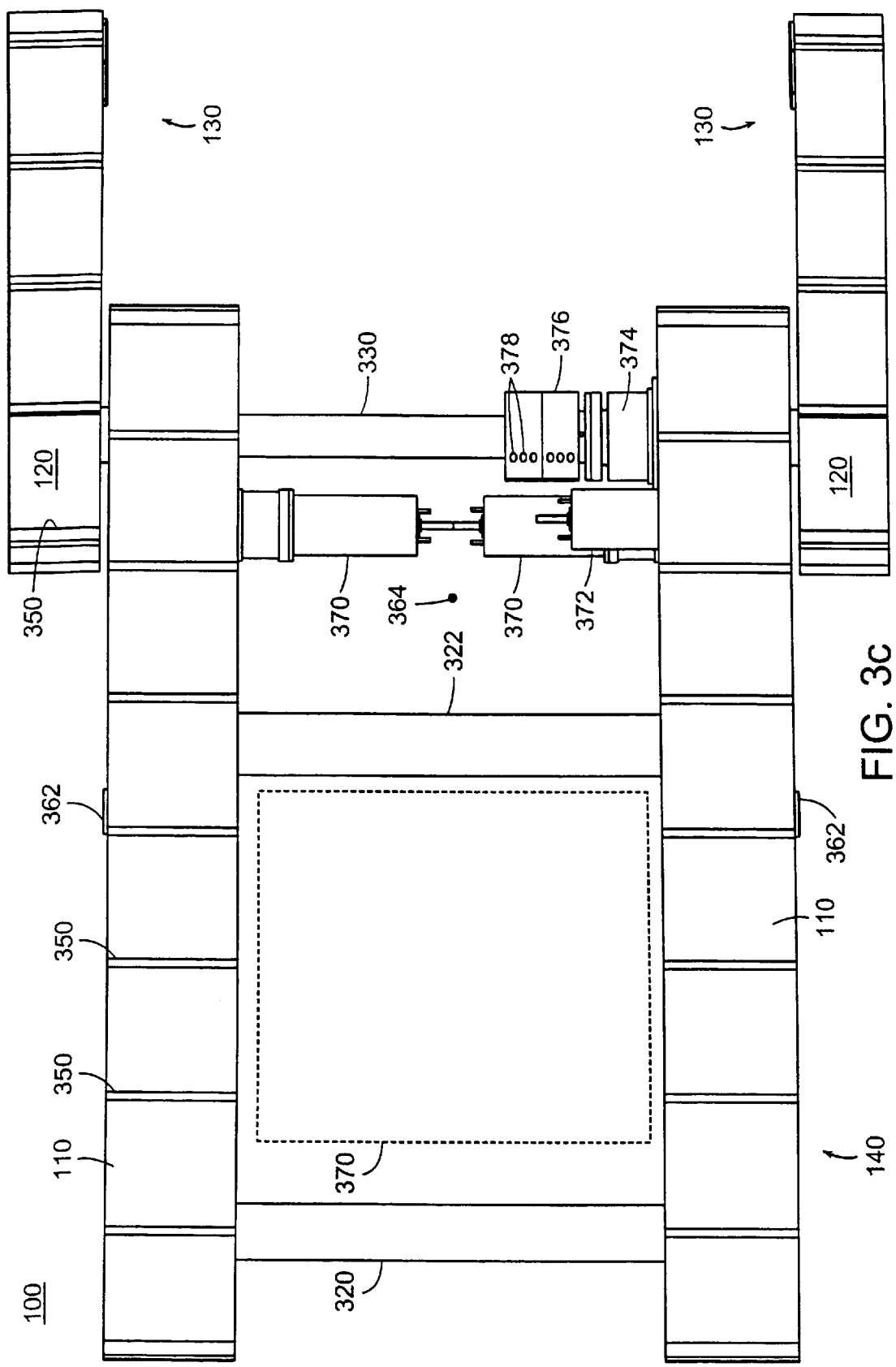

FIGS. 3a–c show robot 100 in a fully extended configuration in which forward arms 130 extend beyond the front of main body 140. The combination of forward tracks 120 and main tracks 110 and provide an extended length base. Main body 140 includes a vertically symmetrical rigid frame 310 which includes parallel vertical side plates 312. Side plates 312 are rigidly coupled by tubes 320 and 322 and an articulator shaft 330. The rigid components are designed for strength and low weight and are made from a material such as 7075-T6 aluminum. Alternative versions of the robot can use other materials, such as other lightweight metals, polymers, or composite materials.

Figure 4A:
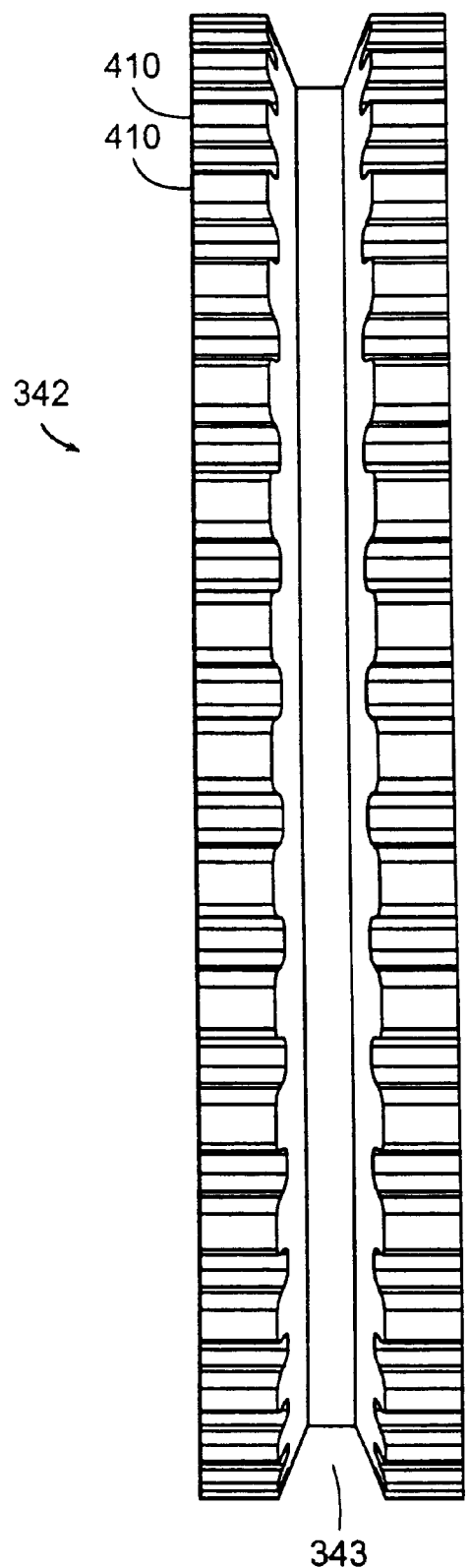
FIGS. 4a–g show idler and drive pulleys.
Figure 4B:
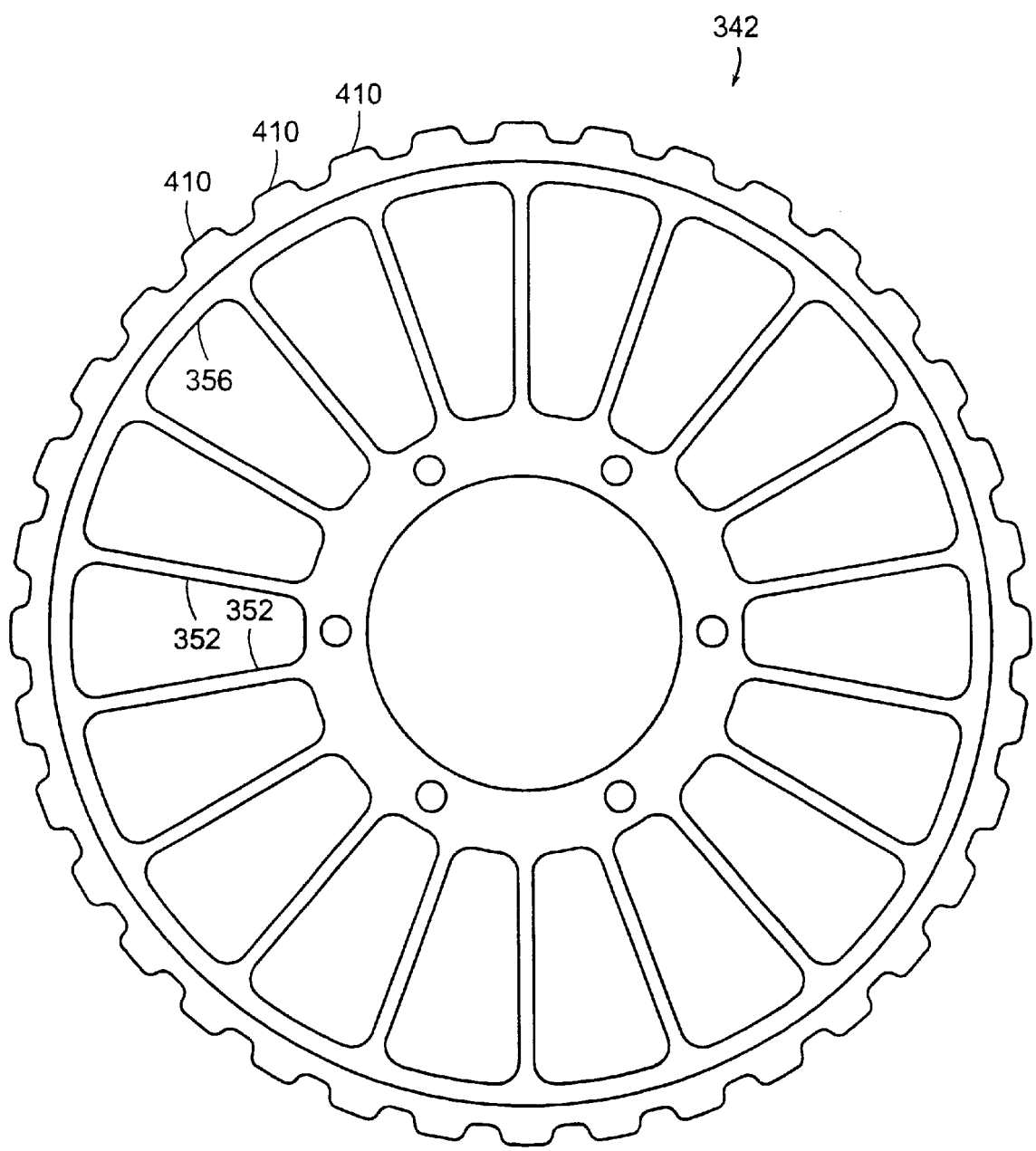
Figure 4C:
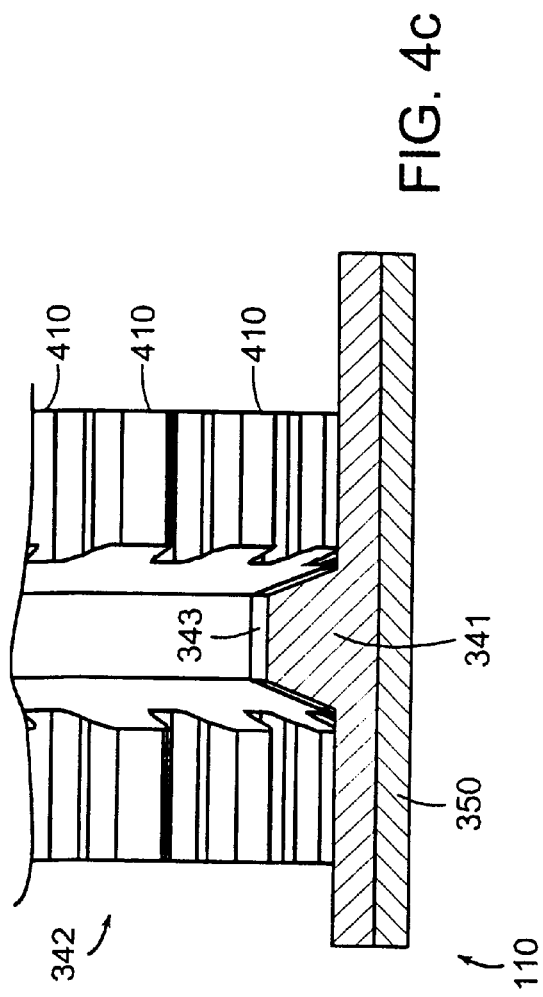
Figure 4D:
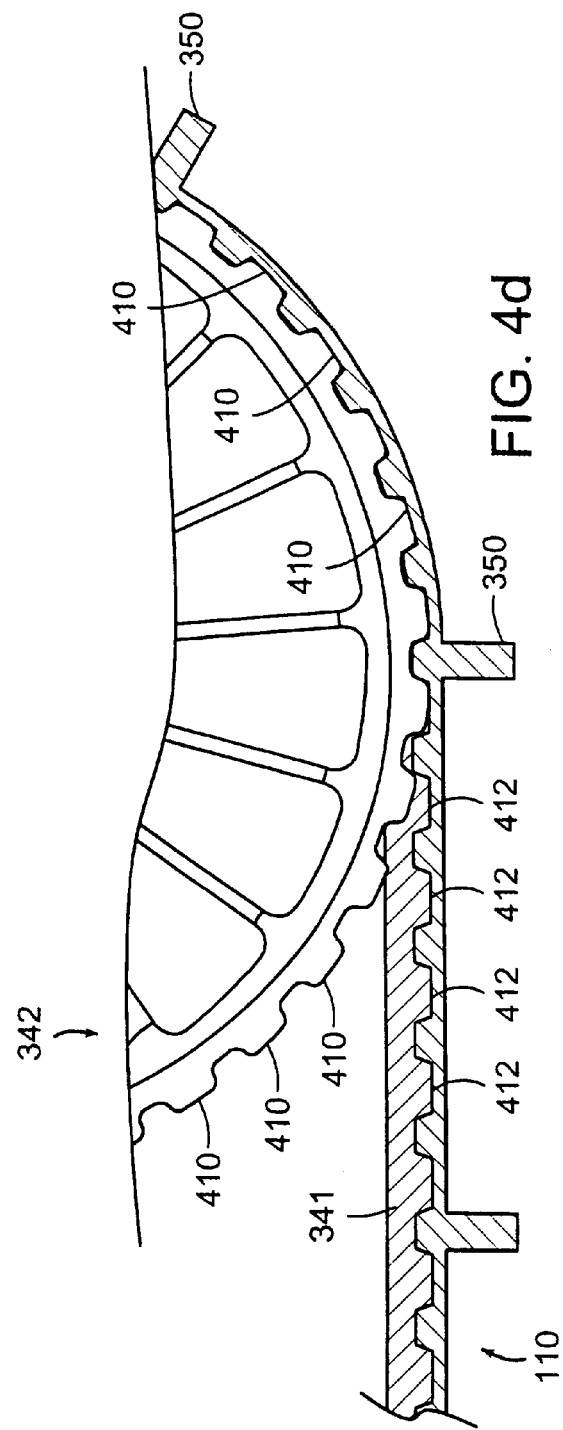
Figure 4F:
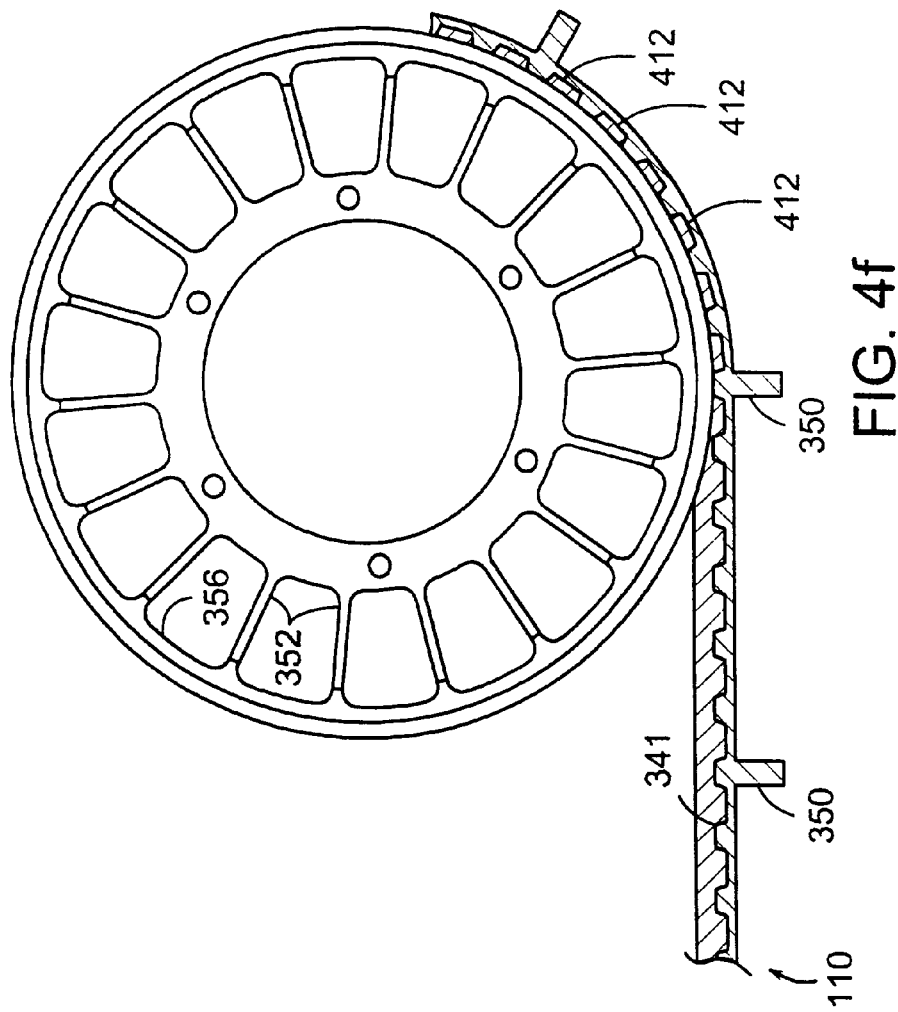
Figure 4E:
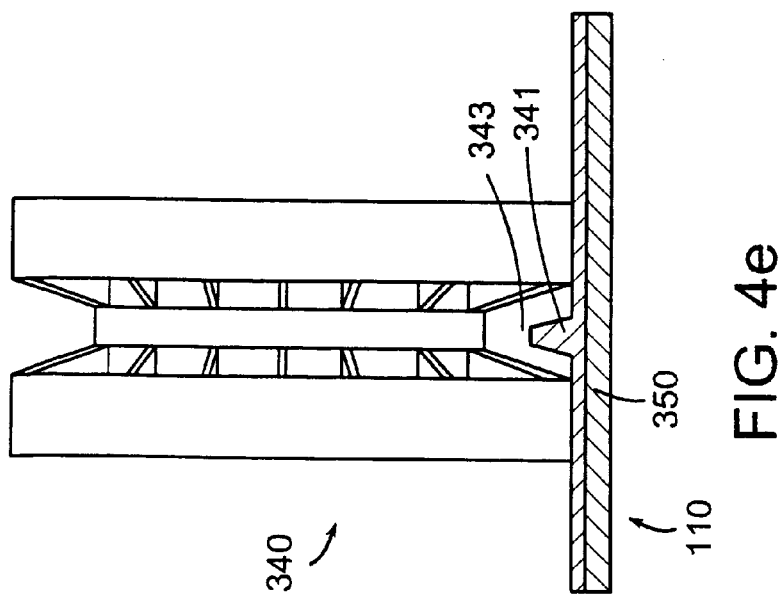

Referring to FIGS. 4a–f, main tracks 110 and front tracks 120 include compliant belts made of a solid polyurethane or a similar flexible material. The belts are highly abrasion resistant and have high strength and minimal stretch due to internal steel or fiber cording. Referring to FIGS. 4a–d, each main track 100 is driven by a toothed main drive pulley 342. Teeth 410 in each main drive pulley 342 mate with grooves 412 on the inside surface of the corresponding main track 110. Referring to FIGS. 4e–f, a smooth surfaced main idler pulley 340 supports each main track 110 at the rear of the robot. Both main drive pulleys 342 and main idler pulleys 340 have V-shaped channels 343 around their circumference. These grooves loosely mate with an integral offset V-shaped rib 341 on the inside of each main track 110. The main and front tracks have soft elastomer cleats 350 spaced along their length. In alternative embodiments, main and front tracks are smooth high-friction tracks.

Alternative versions of the robot can use other types of tracks, such as tracks made up of discrete elements. However, debris may be caught between elements and such tracks are generally heavier than flexible belts. Other flexible materials can also be used for continuous belt tracks. Referring back to FIGS. 3a–c, each front track 120 is narrower but otherwise similar to main tracks 110, having grooves and a V-shaped segment on the inside surface, and soft cleats 350 attached to the outside surface. A front drive pulley 344 drives each front track 120. Each front drive pulley 344 is toothed and has a central V-shaped channel that loosely mates with the V-shaped rib on the inside of the corresponding front track 120. On each side, front drive pulley 344 is coaxial with main drive pulley 342, and both drive pulleys on a particular side turn in unison on a common axle. A smaller smooth surfaced front idler pulley 346, which also has a V-shaped channel, supports each front track 120 at the extreme end of the corresponding arm 130.

Referring again to FIGS. 4a–f, each of the drive and idler pulleys 340, 342, 344, 346 are compliant (75D durometer) and are made of a polyurethane or a similar material. Although flexible, the design and material stiffness provides resistance to lateral loading. Each pulley has a series of radial spokes 352 around a central hub 354. Spokes 352 support a thin outer rim section 356. The combination of spokes 352 and thin outer ring section 356 provide a compliant support for the track that can deform if debris is caught between outer ring section 356 and the track. This allows debris to be caught without necessarily stalling a drive motor or throwing a track.

Figure 4G:
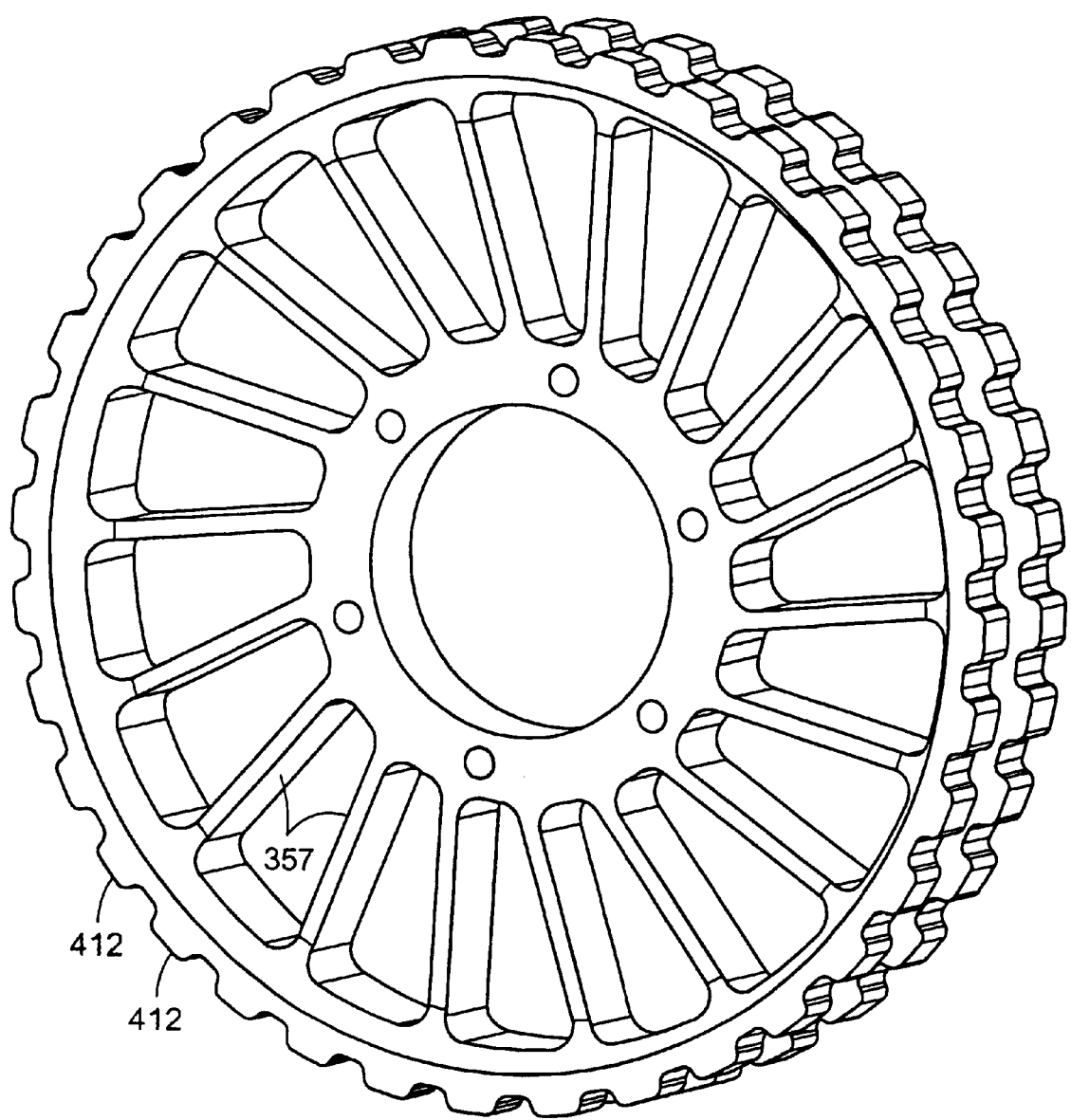

Referring to FIG. 4g, an alternative version of the idler and drive pulleys also has a spoke pattern, but the spokes are "angled" rather than being radial. Angled spokes 357 have less tendency to buckle on direct impact. Alternative materials can also be used, providing more or less compliance, depending on the impact resistance and payload capacity requirements for the robot.

Figure 5:
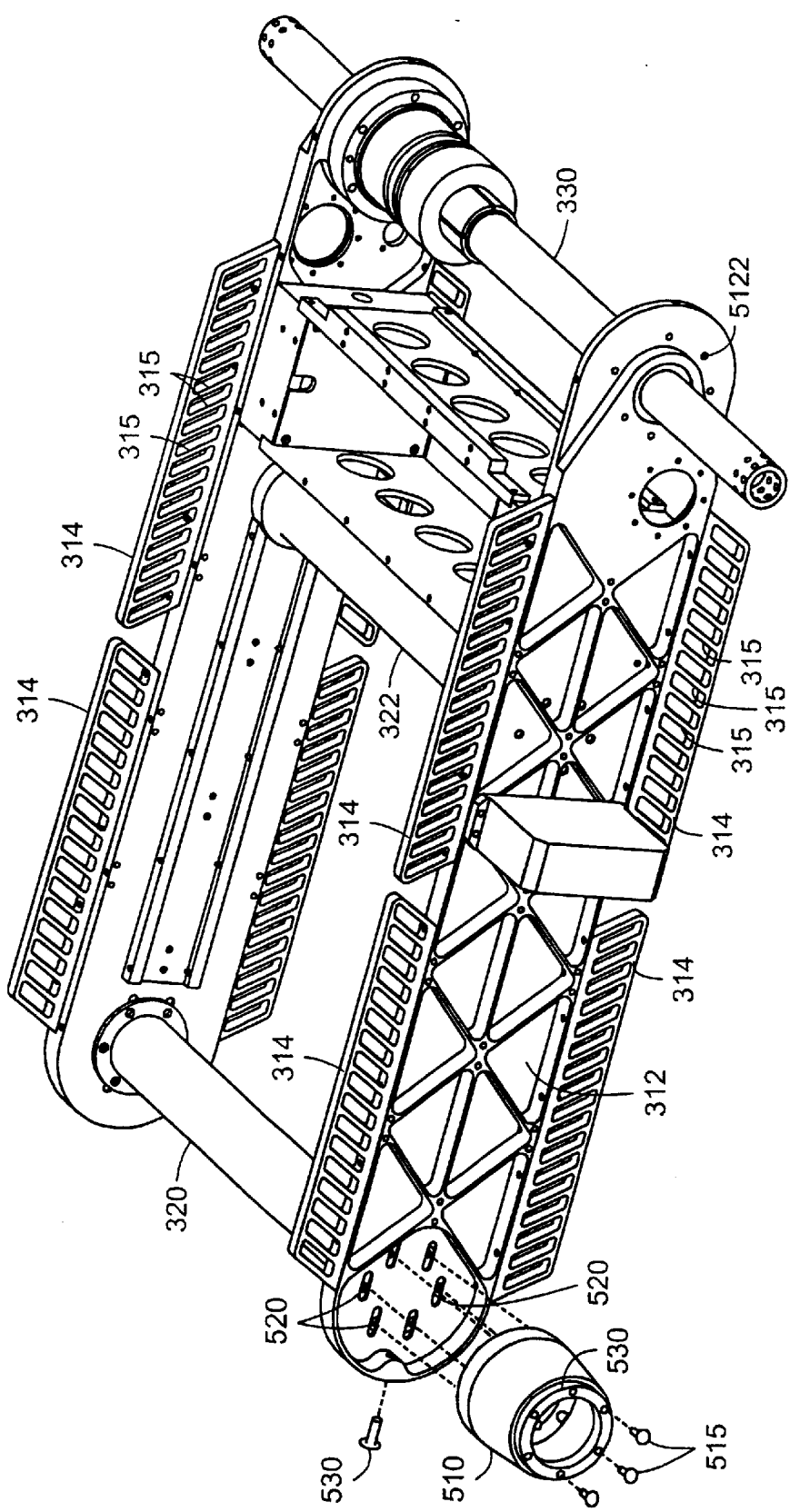
FIG. 5 is a perspective view of a robot frame.

Referring to FIG. 5, on each side, between drive pulley 342 and idler pulley 340. Compliant main track supports 314 provide support for main track 110. Track supports 314 are made of the same material as the drive and idler pulleys. Main track supports 314 are attached by screws to the top and bottom surfaces of side plates 312. Each main track support 314 has a series of angled slots. The slots in the track supports are formed such that a series of angled ribs 315 join the top and bottom edges of the tract support. These ribs bend when the top and bottom edges of a track support are forced together, thereby providing compliant support for each track.

Referring back to FIGS. 3a–b, front tracks 120 are supported by arm side plates 332 using front track supports 334. Front track supports 334 are wedge-shaped and each has a series of angled slots similar to those in main track supports 314. The arm side plates 332 on each side of the robot are rigidly coupled to one another through articulator shaft 330, and therefore move together.

Referring to FIG. 3b, front arms 130 can be continuously rotated around articulator axle 330 as indicated by circle 360. On each side, an arm support 362 is attached to the side plate 312. When arms 130 are rotated to a "stowed" position next to the side plates 312, the front idler pulleys 346 have a clearance fit next to the corresponding arm supports 362. Both arm supports 362 and arms 130 have polymer pieces, such as Derlin, on the mating surfaces.

The robot's mobility system is powered by three separate electrical motors. Referring to FIG. 3c, on each side of the robot a respective identical drive motor 370 is coupled to main and front drive pulleys 342 and 344 by a chain and sprocket mechanism (not shown).

Referring still to FIG. 3c, an articulator drive motor 372 is used to control the angle between arms 130 and the main body. Articulator drive motor 372 is coupled to the input of a harmonic drive 374 which provides a gear reduction to articulator axle 330. Harmonic drive 374 has a central opening through which articulator axle 330 passes. The output of harmonic drive 374 is coupled to a slip clutch 376 which provides output torque to articulator axle 330. Slip clutch screws 378 are tightened to provide adequate transfer of torque to rotate arms 130 while allowing the articulator axle to slip in the event that a large torque is applied to the arms. Articulator axle 330 passes through a central opening in drive pulleys 342 and 344 and is attached to arm side plates 332.

In this version of the robot, drive motors 370 and articulator motor 372 are 90 watt DC brushed motors. In other versions of the robot, brushless motors can be used. Drive motors 370 are geared down 32.7:1 to the drive pulleys. Harmonic drive 374 provides a 427:1 gear reduction between articulator drive motor 372 and articulator axle 330, thereby providing a maximum torque of approximately 127 N·m to arms 130. Slip clutch 376 prevents overloading of harmonic drive 374 if the torque exceeds the maximum torque that can be provided by articulator drive motor 372, for instance due to an impact on the arms.

Due to the placement of the motor and drive components, the center of mass of robot 100 is well forward. In particular, referring to FIG. 3b, center of mass 364 falls within the circle 360 of rotation of arms 130. This location enables or aids certain maneuvers such as stair climbing and self righting, as are described below.

Referring to FIG. 3c, robot 100 includes a payload volume 370 between side plates 312, and between structural tubes 320 and 322. The main body, including the payload volume, and the drive motors and drives, is housed in a thin, impact resistance, polycarbonate shell (not shown). The main body is totally within the volume defined by the main tracks, and furthermore is sufficiently thin to provide ground clearance in both upright and inverted orientations of the robot.

As an alternative to payload being contained within payload volume 370, payloads can be placed on the top of the robot, preferably near the center of mass to aid operations such as stair climbing. Although invertible operation may not be possible in this case, larger payloads can be carried in this way.

Referring again to FIG. 5, each of the idler pulleys are attached to side plates 312 by a pulley holder 510 which attaches to the side plate using a series of radially positioned screws 515. Screws 515 pass through slots 520 in the side plates. This allows each pulley holder to slide in a back and forth direction. A tensioning screw 530 passes through a hole in side plate 312 and mates with threads in pulley holder 510. Tensioning screw 530 is used to adjust the position of the pulley holder prior to tightening the screws. Pulley holders 510 include ball bearings 530 which support the idler pulleys. A similar slot and tensioning screw arrangement is used on the front tracks (not shown in FIG. 5). The front and main drive pulleys are attached to side plates 314 using similar pulley holders which mate with holes 522 (rather than slots) in the side plates 312. The tensioning mechanism allows easy replacement of the tracks, for example, to change a cleat design or material to better match the environment the robot must traverse.

Rather than using ball bearings 530 to support the drive and idler pulleys, alternative versions of the robot can use small diameter polymer bearings. Although polymer bearings have somewhat greater friction, they cost less than ball bearings and reduce maintenance due to dirt contamination. Polymer bearings are also more shock resistant than ball bearings.

This version of robot 100 is sized to be portable, and is approximately 62.5 cm (24.6") long (with arms stowed) by 50.8 cm (20") wide by 16.8 cm (6.3") high, and weighs 10.5 kg (23 lbs.) The robot can be carried by a person on his or her back, for example, attached to a special frame or stowed in a backpack. Structural tube 320 can also serve as a carrying handle.

Main tracks 110 are 7.6 cm wide (3") and front tracks 120 are 5.1 cm wide (2"). Cleats 350 extend 0.95 cm (0.4") from the outside surface of the tracks. Approximately half of the frontal area of the robot is tracked. Main tracks 110 are wide for maximum "grab" of the surface during normal high speed locomotion and are separated sufficiently for efficient skid steering. Front tracks 120 are as small as possible to be effective while minimizing the mass of arms 130. In alternative versions of the robot, the front tracks can be made even narrower since the articulation is designed for limited use in certain situations, such as stair climbing.

All the main and front drive and idler pulleys are 2.54 cm (1") wide, thereby minimizing the area that debris can be caught between the pulleys and the tracks, while still being able to deliver maximum power to the tracks.

Rigid frame 310 and payload volume provide a ground clearance of 4.1 cm (1.6") on either side. The robot can carry a payload of up to 10 kg (22 lbs.). If the payload is positioned over the center of mass, the robot can still perform operations such as stair climbing.

In operation, robot 100 is designed to maneuver at high speed in rough terrain. It may collide with objects and suffer tumbles and falls. For instance, the robot may tumble when descending stairs. Furthermore, the robot may be deployed by tossing it out of a helicopter. Therefore, the robot is designed to be as impact resistant as possible. Also, as the robot is completely invertible, it can immediately continue operation after it is inverted in a fall or collision.

Impact resistance is accomplished, in part, by surrounding much of the vehicle with compliant main and front tracks 110 and 120 with soft cleats 350. The tracks and cleats provide a first layer of impact protection. The tracks are supported by compliant idler and drive pulleys 340, 342, 344, and 346 and by compliant main and front track supports 314 and 334, which, working together, provide a second layer of impact protection.

Referring back to FIG. 3a, side plates 312 are recessed within the track volume, thereby reducing the likelihood that the frame will be directly impacted from the side in a tumble or a fall. Similarly, the main body and payload volume are recessed relative to the top and bottom of the main tracks, thereby reducing the likelihood that the main body will be impacted.

In the event of a tumble or a fall, arms 130 can be vulnerable to damage if they are extended away from the main body. For instance, a fall laterally onto the tip of an arm could damage it. However, arms 130 are, in general, used in situations where the possibility of a fall is small. In most operations, the robot will have the arms "stowed" at its sides. Arm supports 362 provide significant lateral support to the arms during impacts in the stowed position. To further prevent possible damage, when robot 100 detects that it is in free fall using its sensor system, it automatically assumes the stowed position without requiring operator intervention.

Robot 100 is designed to maneuver in dirt and debris. There is a possibility that such dirt and debris can be caught between the tracks and the drive and idler pulleys. The idler and drive pulleys are compliant and can tolerate material being caught between them and the tracks. The V-shaped ribs 341 (FIG. 4) on the inside surfaces of the tracks which mate with the V-shaped channels 343 on the pulleys are deep enough to prevent "throwing" a track. Also, the fit between the V-shaped channel and the V-shaped grooves is loose thereby allowing debris to be caught without necessarily dislodging the V-shaped segment. Furthermore, the idler pulleys do not have teeth, thereby further reducing the effect of debris entrainment by allowing debris to pass under the idler pulleys in the grooves of the tracks. Finally, the pulleys are narrow, thereby minimizing the places that debris can be caught.

Further debris resistance can be obtained in alternative versions of the robot using active debris removal approaches. For instance, a stiff brush positioned before each pulley can prevent debris from entering the pulleys. Compressed air jets can also be used in place of the brushes to remove debris on the tracks. Flexible or rigid skirts, placed at an angle in front of each of the pulleys, can also divert debris before it enters the pulley.

Referring to FIG. 3c, robot 100 is controlled using left and right drive motors 370 and articulator motor 372. Steering is accomplished using differential speed of the tracks on either side of the robot. The robot will, in principle, skid around its center of gravity 364 (shown in FIG. 3c) allowing complete turning with the extremes of the robot staying within a 100 cm (39.4") diameter circle.

In operation, robot 100 has several mobility modes including fully extended, stowed arms, inclined, upright, and "wheelie" modes. In addition, robot 100 can perform several maneuvers including self righting, stair climbing, and recovery from high centering.

A fully extended mode is shown in FIGS. 3*a–c*. In this mode, the longest possible "wheelbase" is achieved. This mode is useful, for instance, in a stair-climbing maneuver describe below.

Figure 6:
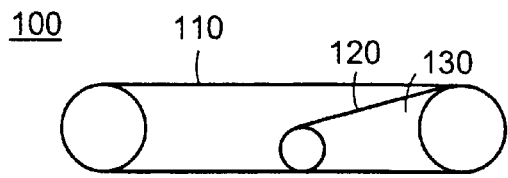
FIG. 6 is a schematic side view of the stowed position.

Referring to the schematic view of FIG. 6, the stowed arms mode is the most compact configuration of robot 100. Arms 130 are stowed next to the main track such that both main tracks 110 and forward tracks 120 provide traction. This configuration is used for high speed mobility and for traversing rough terrain. It is also the configuration that is used when robot 100 is launched by tossing or dropping it through a window or door or when the robot tumbles.

Figure 7A:
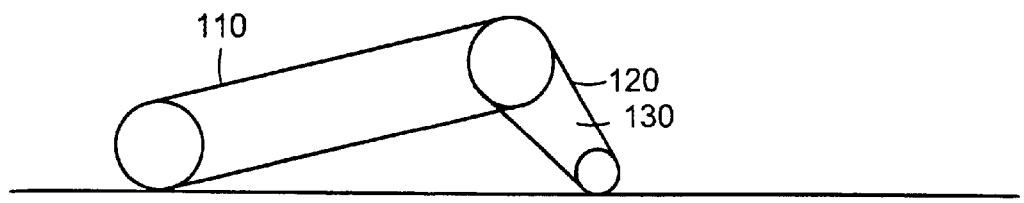
FIG. 7a is a schematic side view of the inclined position.

Referring to FIG. 7*a*, robot 100 can deploy arms 130 to raise the forward end of the main body in an inclined mobility mode. This posture is useful for increasing ground clearance to traverse rubble-strewn terrain and to increase the height of sensors on the platform, such as a CCD camera. Note that in the inclined mobility mode, the robot travels on four points of contact at the extreme ends of each track, somewhat as it were on wheels instead of tracks.

Figure 7B:
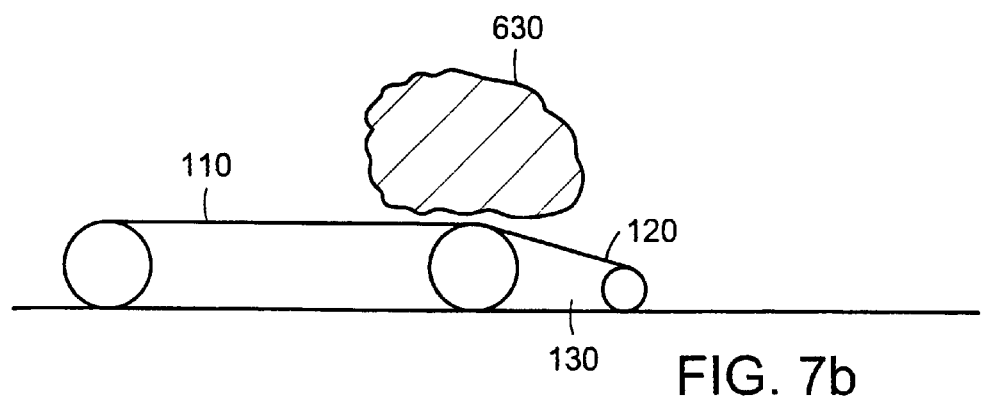
FIGS. 7b–c are schematic side views of a maneuver to raise an object using the inclined position.
Figure 7C:
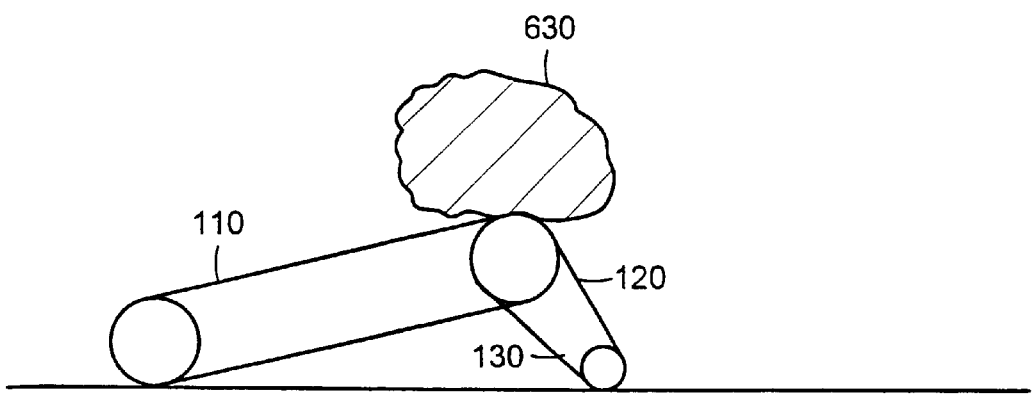

Referring to FIGS. 7*b–c*, by combining the inclined mode with the fully extended mode, the robot can lift and carry objects, rather like a forklift. Referring to FIG. 7*b*, robot 100 first adopts the fully extended position with its arms 130 outstretched and then maneuvers its arms under an object 630 to be carried or lifted. Referring to FIG. 7*c*, robot 100 then raises itself into the inclined mobility position, thus raising object 630. The object needs to be small enough to fit between the tracks, of course, in order to be carried away by the robot.

Figure 8A:
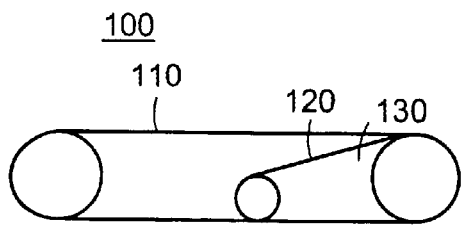
FIGS. 8a–c are schematic side views of a maneuver to achieve an upright position.
Figure 8B:
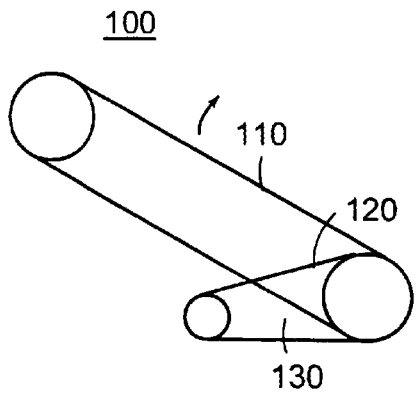
Figure 8C:
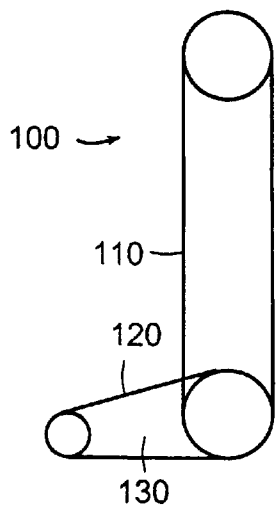

Referring to FIGS. 8*a–c*, to assume an upright "prairie dog" mode, robot 100 balances the main body on arms 130. Referring to FIG. 8*a*, robot 100 begins in a stowed position, and then using articulator drive motor 372 (FIG. 3*c*) applies a torque to the arms. Since the center of gravity is within arc of the arms (as shown in FIG. 3*b*), the main body is raised (FIG. 8*b*) until it reaches a high position (FIG. 8*c*) which is short of the point at which the robot would topple. As is described further below, this upright position allows sensors to be placed at the highest possible elevation, and also provides the smallest possible wheel base. In this upright mobility mode, the robot is able to drive on the front tracks and to pivot in place with the tracks staying within a small circle, in principle, as small as 60 cm (23.6") diameter. Therefore, the upright mobility position is useful for navigating in narrow corridors and passageways.

Figure 9:
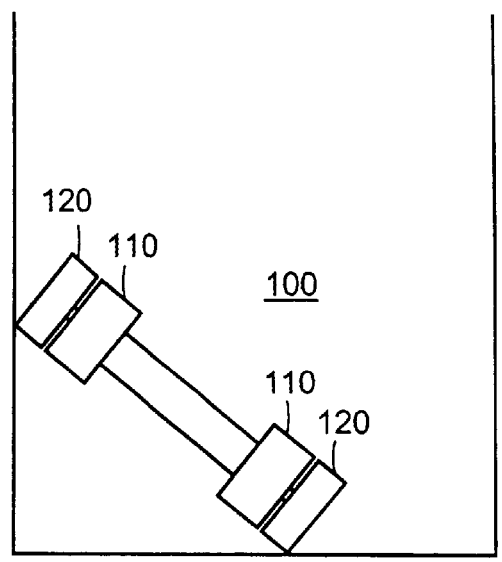
FIG. 9 is a schematic front view of the "wheelie" position.

Referring to FIG. 9, a side "wheelie" mobility mode is used to navigate a passageway that is even smaller than the width of the robot in the upright position. In the side wheelie mode, the robot rests one track on the side wall and the other track on the floor. It then moves forward in a tilted orientation as shown.

Figure 10A:
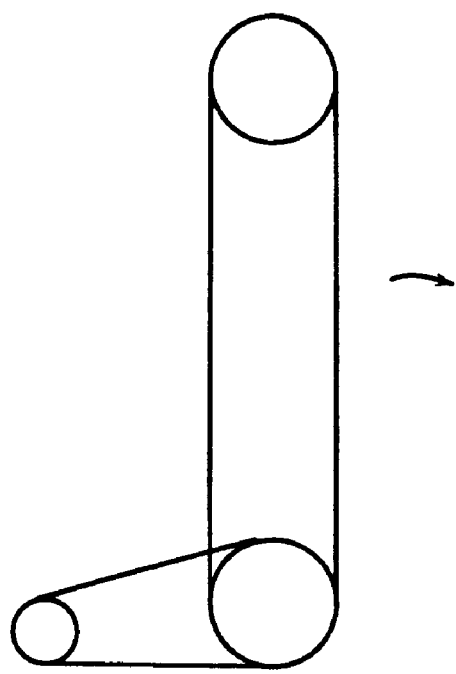
FIGS. 10a–b are schematic side views of a self-righting maneuver.
Figure 10B:
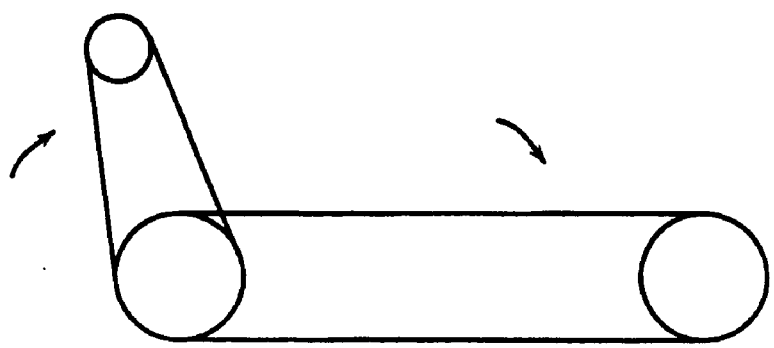

Referring to FIGS. 10*a–b*, a self righting maneuver is related to the upright mobility mode. In this maneuver, in order to invert itself, the robot begins in a stowed mode and raises itself as it does when attaining the upright mobility mode (FIGS. 8*a–c*). However, rather than stopping in the upright position shown in FIG. 10*a* rotation is continued past the vertical point and the robot falls over (FIG. 10*b*), thereby completing the inversion.

Figure 11:
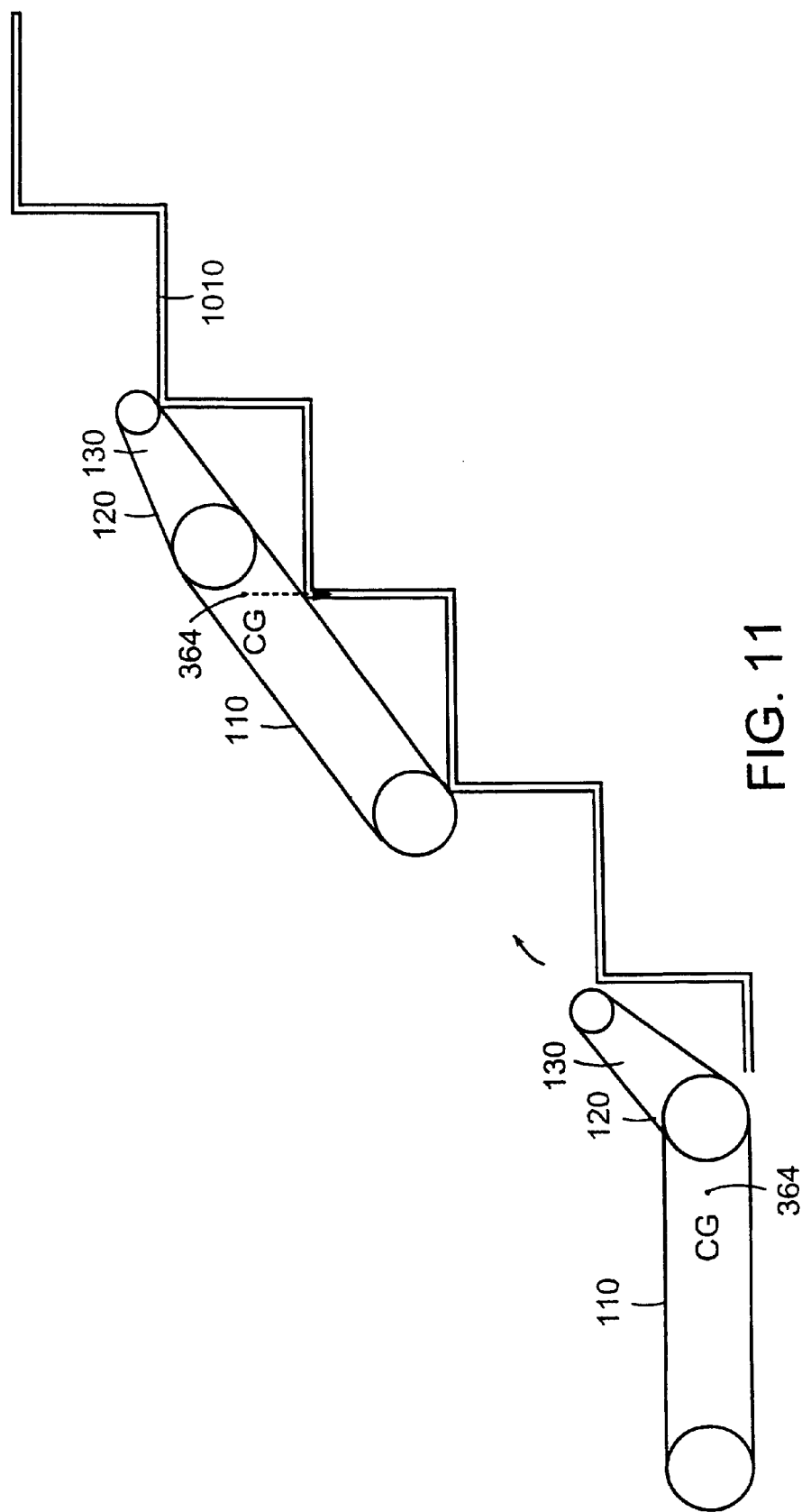
FIG. 11 is a schematic view of a stair climbing maneuver.

Referring to FIG. 11, robot 100 can raise arms 130 in order to mount an obstacle, such as a stair 1010, in its path. To mount the first step of staircase 1110, robot 100 raises its arms 130 and drives forward to raise its main tracks 110 onto the first stair. The robot then assumes a fully extended mode thereby extending its wheelbase to increase it stability and to provide as smooth a ride a possible up the stairs. Soft cleats 350 (not shown in FIG. 11) provide mechanical locking with the stair edge needed to drive the robot up the stairs.

Robot 100 is specifically dimensioned to climb common stairs in this version, with step dimensions of up to a 17.8 cm (7") rise and 27.9 cm (11") tread. As the robot tilts or inclines, the vertical projection of the center of gravity (CG) with respect to the ground moves backwards. For stable travel on stairs, the extended wheel base of the main and forward tracks in the fully extended mode span a minimum of two steps (i.e. at least 66.2 cm (26.1") for 17.8 cm (7") by 27.9 cm (11") stairs) such that the vehicle is supported by at least two stair treads at all times. Note that robot 100 can climb larger stairs for which it cannot span two steps, but the traverse will not be as smooth as the robot will bob with each step.

To avoid nosing up or down (pitch instability) while climbing stairs, the vertical projections of the center of gravity is located in a stable range which is at least one step span (i.e., 33.1 cm (13") for 17.8 cm (7") by 27.9 cm (11") stairs) in front of the furthest rear main track ground contact and at least one step span behind the front most front track ground contact.

Alternative versions of the robot can use shorter track dimensions that do not satisfy the requirement of spanning two steps, and the center of gravity can be outside the stable range. Although such robots may not be as stable on stairs, inertial effects add to dynamic stability at increased velocities, smoothing the traverse on stairs. Also, the front extremities of arms 130 can be weighted to move the center of gravity forward in the fully extended position. However, adding weight at the end of the arms also has the negative effect of reducing robustness.

Figure 12A:
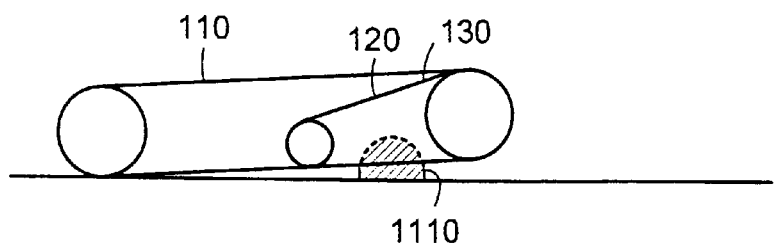
FIGS. 12a–c are schematic side views of a maneuver to recover from a high centering.
Figure 12B:
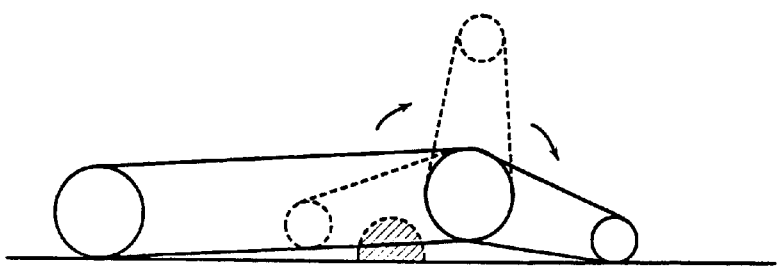
Figure 12C:
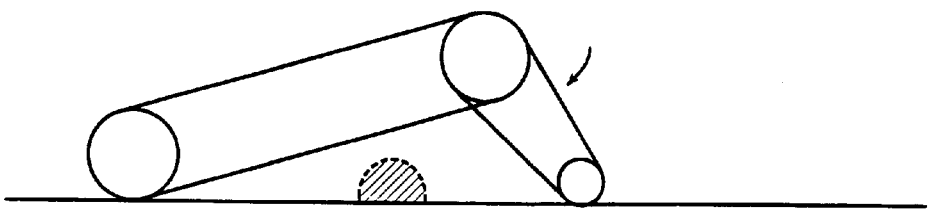

Referring to FIGS. 12*a–c*, robot 100 has relatively small vertical clearance below its main body. In this version of the robot, in order to accommodate the drive motors and gearing within the front section of the mobility platform resulted in only 4.11 cm (1.6") ground clearance on both top and bottom of the robot. Referring to FIG. 12*a*, robot 100 can lose traction in a high centering situation in which it rests on an obstacle 1110. Referring to FIGS. 12*b–c*, arms 130 are lowered (illustrated here as swinging clockwise to the front of the robot) to gain traction with the ground and then the robot can drive away in the inclined mobility mode.

Figure 13:
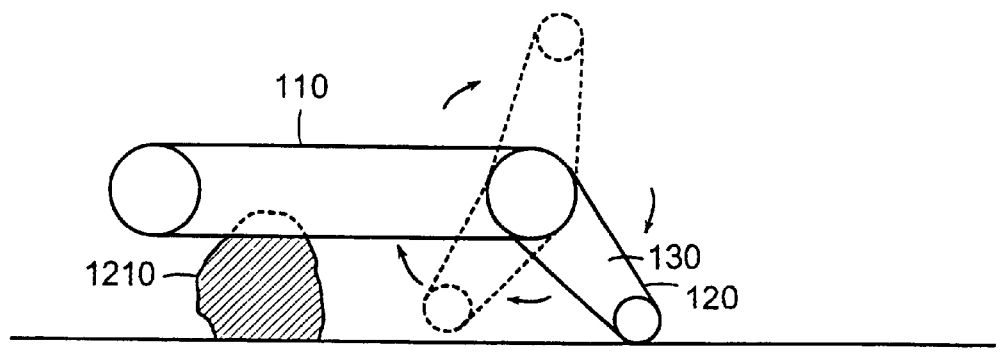
FIG. 13 is a schematic side view illustrating "paddling" using the arms.

Referring to FIG. 13, another mode of recovery from high centering makes use of continuous rotation of arms 130. Continuous rotation in one direction essentially "paddles" the robot off obstacle 1210 using only the articulator drive motor 370, for example.

Note that the likelihood of a high centering situation is reduced for robot 100 since approximately half of the frontal area that is tracked. Therefore, obstacles are as likely to encounter the tracks as to pass under the main body.

The robot's low and forward positioned center of gravity also allows the robot to climb steep inclines, given enough traction, without the robot toppling. Based on the location of the center of mass, this version of the robot can, in principal, climb a 77° incline.

Robot 100 includes the capability of carrying a variety of sensors, including cameras, sonar sensors, infra-red detectors, inertial sensors, motor position, velocity and torque sensors, inclinometers, a magnetic compass, and microphones. Sensors can be placed on all surfaces of the robot.

Sensors can be shielded within the track volume or within the protective shell of the main body. The front and rear of the vehicle has room for sensors within the 24.4 cm (10") width not covered by tracks, although the rear is partially occluded by the rear handle. The top and bottom of payload volume 370 (FIG. 3c) is free for sensor placement, as are side plates 312. Sensors mounted to the front of arm supports 362 are occluded when arms 130 are stowed. Sensors can also be mounted on arm side plates 332. Articulator axle 330 is hollow allowing power and signal cables from the arms to pass to a slip ring allowing continuous rotation of the arms. The robot's self-righting capability permits the use of fewer specialty sensors since not all sensors have to be duplicated on both the top and the bottom of the main body. When there is redundancy of sensors on both the top and bottom of the robot, this feature allows the robot to continue functioning if one or more of its sensors fails—it simply inverts and uses the undamaged sensors on the other side.

Figure 14A:
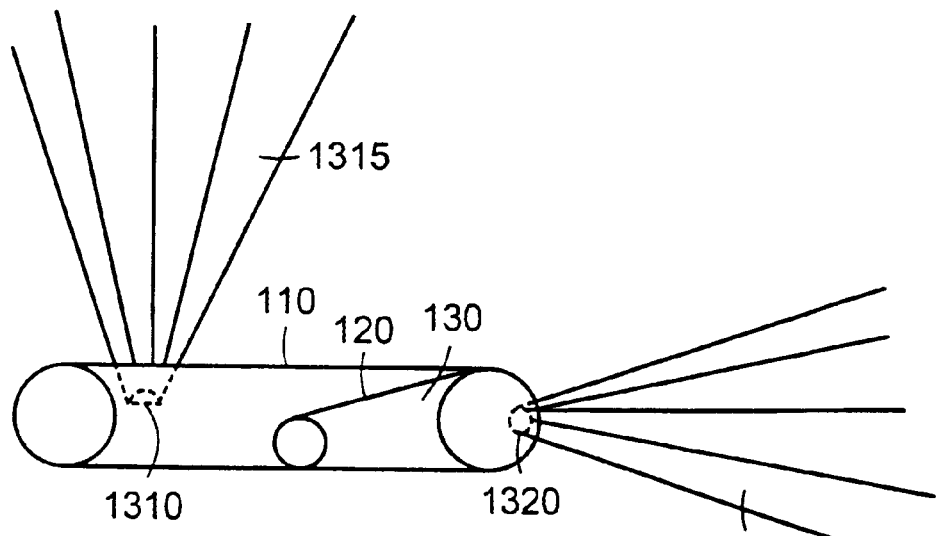
FIGS. 14a–b are schematic views showing camera placement.
Figure 14B:
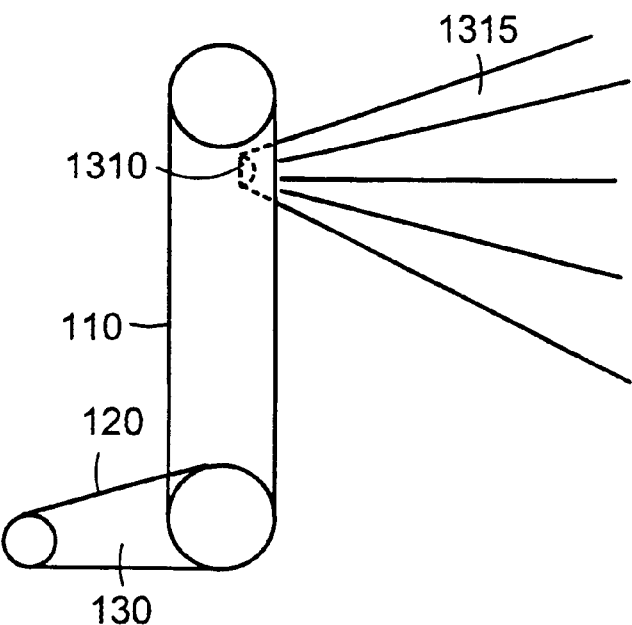

Referring to FIGS. 14a–b, a two- or three-camera array 1310, which is used for stereoscopic vision, is placed at the top of the robot for operation predominantly in the upright mobility position only (FIG. 14b). Another camera 1320 is placed at the front of the robot for navigation and video transmission back to remote control system 150. Camera array 1310 and camera 1320 have fields of view 1315 and 1325 respectively. A microphone (not shown) is placed at the front for surveillance and for providing directional information. A rate gyroscope is placed near the center of gravity 364 of the robot. Optional accelerometers can be located near the rate gyroscope.

Figure 15A:
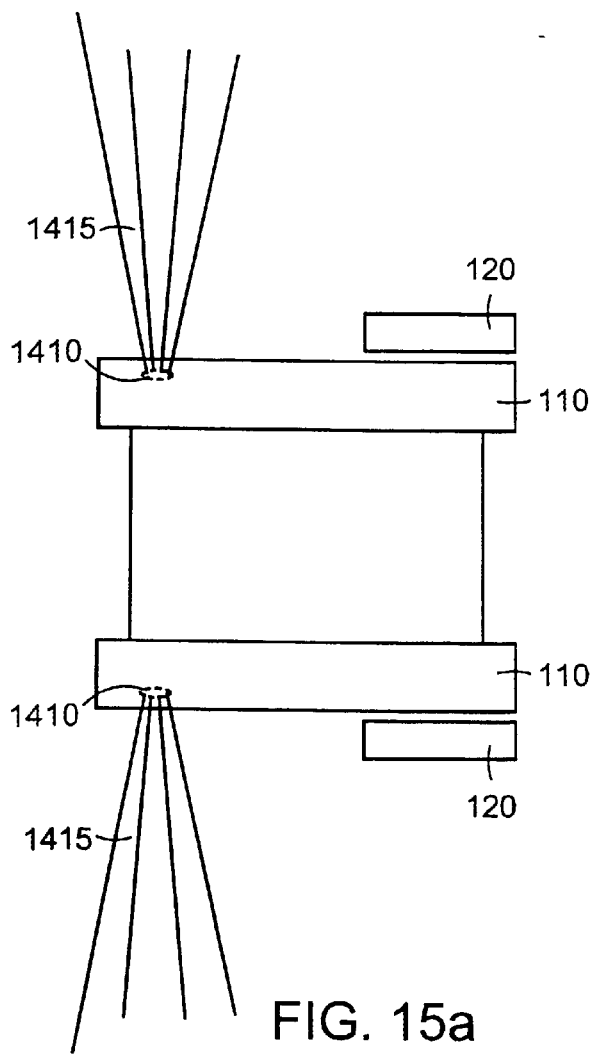
FIGS. 15a–b are schematic views showing placement of sonar sensors.
Figure 15B:
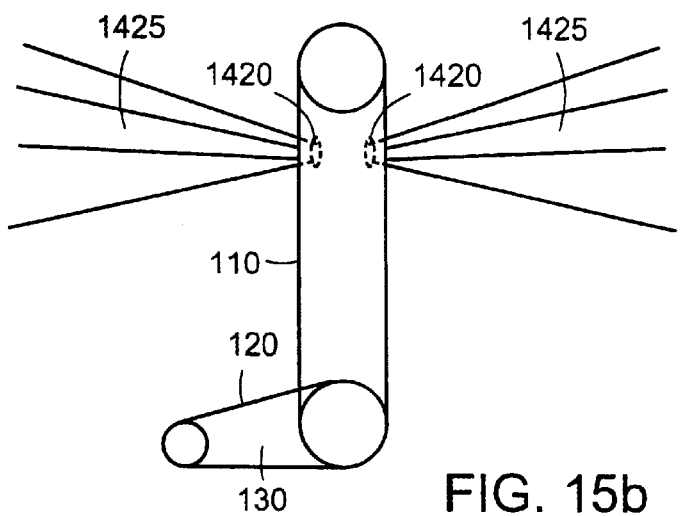

Referring to FIGS. 15a–b, two sonar sensors 1420 are placed at the top and bottom of the robot respectively, for operation in the upright position (FIG. 15b). Two more sonar sensors 1410 are placed on the sides of the robot to be as high as possible when the robot is in the upright position. The sonar sensors are positioned high off the ground because they have a fairly large cone of sensitivity, and may be confused by the ground or very small objects if placed low to the ground.

Figure 16A:
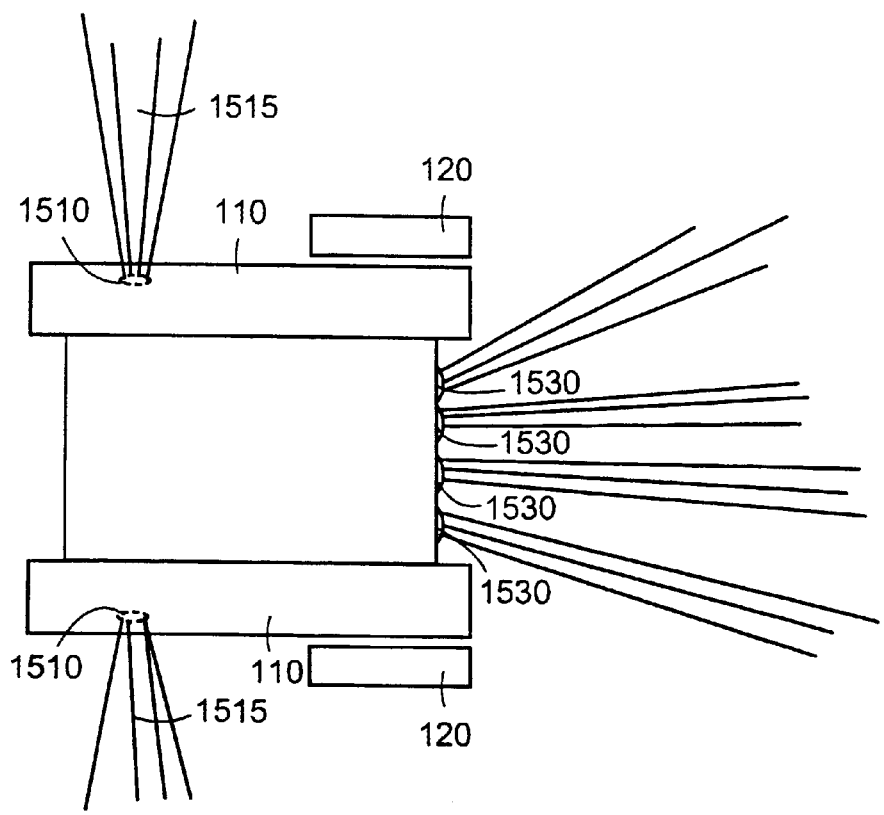
FIGS. 16a–b are schematic views showing placement of infra-red sensors.
Figure 16B:
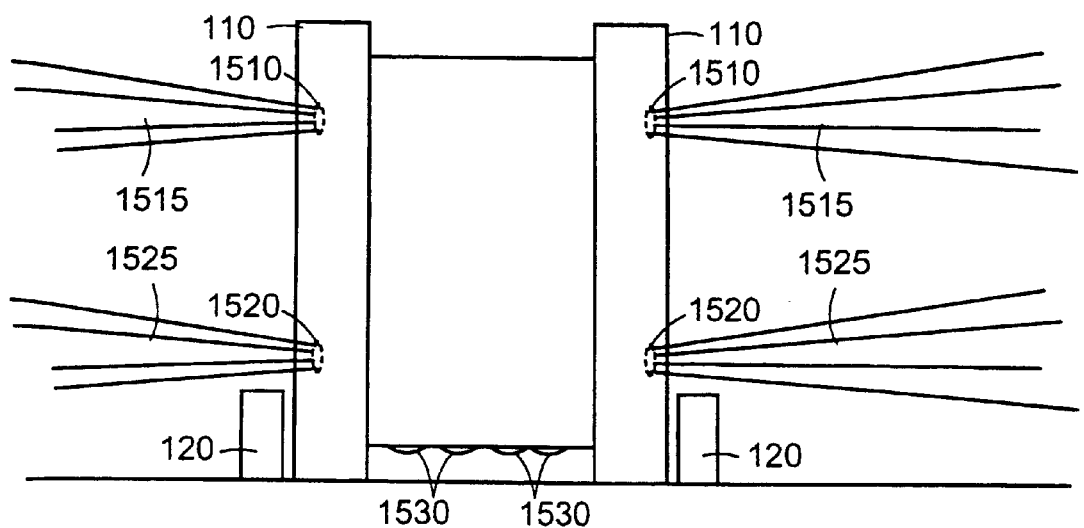

Referring to FIGS. 16a–b, four infrared sensors 1530 are placed at the front of the robot, and two on each side 1510 and 1520, one in the back and one in the front. The side-back IR's are in the same position as the side sonar sensors and can be used in either upright or stowed position, while the side-front infra-red sensors 1520 are occluded by the arms in stowed position and are only used in upright position.

In this version of the robot, there are no rear-facing sensors, although they can be added if needed. Robot 100 can move to its upright mobility position to use the sonar sensor on the bottom of the robot. Or, it can rotate quickly in either the stowed position or the upright position, which has a very small turn radius, to use its entire sensor suite to acquire information about the environment in any direction.

Figure 17:
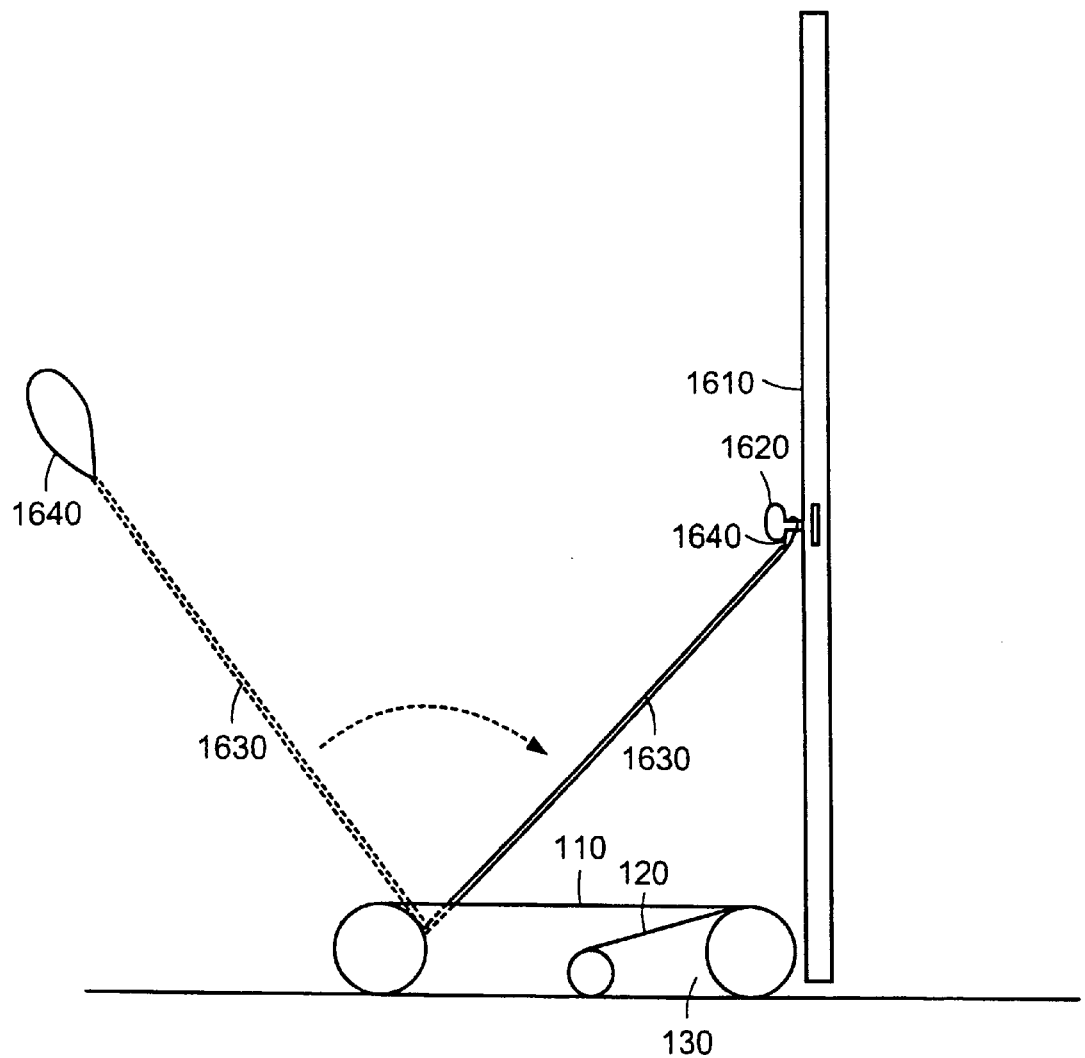
FIG. 17 is a diagram showing a door opening mechanism.

In addition to placing sensors directly on the outside surface of the robot, a retractable sensor mast can be extended away from the top or the bottom of the robot. Sensors, such as cameras, can be mounted on the sensor mast. Robot 100 can include a variety of manipulators. Referring to FIG. 17, one such manipulator is a door opening mechanism that allows robot 100 to open a closed door with a standard height door knob 1620. An extendable mast 1630 is attached to the robot. Mast 1630 has a high friction, flexible hoop 1640 at the top of the mast. Hoop 1640 is rotated by an actuator located within the attachment section of the hoop and mast. The procedure for engaging door knob 1620 is reminiscent of a ring toss game. The object is to place the hoop, which remains attached to the mast, over the door knob. Once the hoop is over the door knob, the mast retracts to snug the hoop against the door knob. The hoop is then rotated and the door knob is rotated due to the frictional forces holding the hoop against the door knob. Once the door has been jarred opened, the mast extends to disengage the hoop from the doorknob.

Alternative versions of the robot can be completely waterproofed, thereby allowing underwater operation. Also, larger or smaller versions of the robot can be used for different applications. The drive system in other versions of the robot can allow independent rotation of the arm on each side of the robot, and separate drive motors for the main and front tracks can be used.

Remote control system 150 (FIG. 1) provides a user interface to operator 160 that allows teleoperation of robot 100.

Alternative versions of the remote control system 150 support teleoperation as well as a means of switching between teleoperation and autonomous control. The user interface permits transitions between autonomous and teleoperated control that are almost imperceptible to the user. That is, the user can interrupt autonomous operation of the robot at any time to give commands and direction, and the robot would operate autonomously when not receiving particular directions from the user. The system provides a predetermined warning signals to the operator, for instance if it is unable to operate autonomously, possibly by means of a vibrating unit that could be worn by the operator and which would be effective in a noisy environment. In addition, the user can add additional tasks to the robot's mission and request notification from the robot when milestone tasks have been achieved.

Versions of the robot can perform various autonomous tasks which can be initiated by the operator from remote control system 150. These include obstacle avoidance, wall following, climbing stairs, recovery from high centering, returning "home," opening doors, searching for a designated object, and mapping. The robot can use the various mobility modes described above in these autonomous operations, and if necessary, can call for operator assistance during its execution of a task. Alternative configurations of articulated bodies can be used. For example, a single central "arm" can be used and the arm or arms do not necessarily have to be tracked.

Other embodiments of the invention are within the scope of the following claims.

What is claimed is:

1. An impact resistance tracked vehicle comprising:
   a main frame;
   a pair of parallel main tracks, each of the parallel main tracks including a flexible continuous belt;
   side plates, each of the side plates being associated with a corresponding one of the parallel main tracks; and
   on each side of the main frame, two compliant pulleys coupled between one of the parallel main tracks and the main frame, and a plurality of compliant track supports coupled between the parallel main tracks and the side plates, the plurality of compliant track supports extending along top and bottom surfaces of the parallel main tracks;

wherein each compliant pulley includes a compliant outer rim, a hub, and a plurality of compliant spoke segments coupled between the rim and the hub.

2. The vehicle of claim 1, wherein the plurality of compliant track supports comprise longitudinal track supports that are coupled between the main frame and the continuous belts, each longitudinal track support having a series of open slots forming a series of rib sections between the upper and lower edges of the longitudinal track support.

3. The vehicle of claim 1, wherein the pulleys and main frame are recessed within volumes defined by the parallel main tracks.

4. The vehicle of claim 1, wherein the parallel main tracks each includes a series of compliant cleats attached transversely on an outside of the flexible continuous belt.

5. The vehicle of claim 1, wherein the parallel main tracks each include a longitudinal rib coupled to an inside surface of the flexible continuous belt, and each of the compliant pulleys includes a channel around its circumference which accepts the longitudinal rib, the channels being dimensioned larger than the rib thereby allowing debris to be caught between a compliant pulley and a track without dislodging the track from the compliant pulley.

6. The vehicle of claim 1, wherein the main frame, the parallel main tracks, the side plates, the compliant pulleys, and the compliant track supports comprise a main section of the vehicle; and the vehicle further comprises:

a forward section, the forward section comprising an elongated arm having a proximal end and a distal end, the proximal end being pivotally coupled to the main frame near a forward end of the main frame about a transverse axis generally perpendicular to sides of the main frame, the arm having a length sufficiently long to allow the forward section to extend below the main section in at least some degree of rotation of the arm, and a length shorter than a length of the main section;

wherein a center of mass of the main section is located forward of a rearmost point reached by the distal end of the arm when pivoting about the transverse axis.

7. The vehicle of claim 6, wherein the main section is contained within a volume defined by the parallel main tracks and is symmetrical about a horizontal plane.

8. The vehicle of claim 6, wherein the forward section includes a second arm such that the forward section comprises two arms, the second arm being pivotally coupled to the main frame near a forward end of the main frame.

9. The vehicle of claim 8, further comprising an articulator motor;

wherein the two arms of the forward section are rigidly coupled and are rotated together by the articulator motor, the articulator motor providing sufficient torque between the main frame and the two arms to raise a rear end of the main section thereby supporting the vehicle on the forward section.

10. The vehicle of claim 9, wherein continuous rotation of the two arms provides forward locomotion of the vehicle.

11. The vehicle of claim 9, further comprising a harmonic drive coupled between the articulator motor and the two aims, the harmonic drive providing a torque to the two arms that is greater than the torque provided by the articulator motor.

12. The vehicle of claim 9, further comprising a clutch coupled between the articulator motor and the two arms; wherein the clutch allows rotation of the arms without rotation of the motor if the torque between the arms and the main section exceeds a predetermined limit.

13. The vehicle of claim 8, wherein the two arms are coupled to the main frame outside of the main tracks.

14. The vehicle of claim 13, wherein the forward section includes a pair of flexible forward tracks, one of the flexible forward tracks being coupled to each of the two arms.

15. The vehicle of claim 6, wherein the main section includes a pair of drive motors, each of the drive motors being coupled to main and forward drive pulleys on a corresponding side of the vehicle.

16. A vehicle comprising:

a main frame;

a main track having a flexible continuous belt;

a side plate associated with the main track;

a compliant pulley coupled between the main track and the main frame, the compliant pulley driving the main track to move the vehicle;

compliant track supports coupled between the main track and the side plate, the compliant track supports extending along top and bottom surfaces of the main track; and an elongated arm having a proximal end and a distal end, the proximal end being pivotally coupled to the main frame near a forward end of the main frame about a transverse axis generally perpendicular to sides of the main frame.

17. The vehicle of claim 16, wherein the compliant and main frame are recessed within a volume defined by the main track.

18. The vehicle of claim 16, wherein the main track includes a series of compliant cleats attached transversely on an the outside of the flexible continuous belt.

19. The vehicle of claim 16, wherein the main track includes a longitudinal rib coupled to an the inside surface of the flexible continuous belt, and the compliant pulley includes a channel around its circumference which accepts the longitudinal rib, the channel being dimensioned larger than the rib thereby allowing debris to be caught between the compliant pulley and a track without dislodging the track from the compliant pulley.

20. An apparatus comprising:

a pair of continuous tracks;

compliant pulleys, one of the compliant pulleys being disposed within each of the continuous tracks, wherein rotational movement of a compliant pulley causes corresponding movement of a continuous track around the compliant pulley; and compliant tracks supports that provide support for the continuous track, the compliant supports comprising a series of ribs, each of the ribs being angled relative to the pair of continuous tracks.

21. The apparatus of claim 20, further comprising:

a main frame; and an elongated arm having a proximal end and a distal end, the proximal end being pivotally coupled to the main frame near a forward end of the main frame about a transverse axis generally perpendicular to sides of the main frame.

* * * * *